United States Patent
Jindal et al.

(10) Patent No.: US 11,068,482 B2
(45) Date of Patent: Jul. 20, 2021

(54) COMPUTATION REUSE IN ANALYTICS JOB SERVICE

(71) Applicant: Microsoft Technology Licensing, LLC, Redmond, WA (US)

(72) Inventors: Alekh Jindal, Kirkland, WA (US); Hiren Patel, Bothell, WA (US); Shi Qiao, Bellevue, WA (US); Jieming Di, Bellevue, WA (US); Malay Kumar Bag, Kirkland, WA (US); Zhicheng Yin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 717 days.

(21) Appl. No.: 15/952,347

(22) Filed: Apr. 13, 2018

(65) Prior Publication Data
US 2019/0318025 A1    Oct. 17, 2019

(51) Int. Cl.
*G06F 16/00*  (2019.01)
*G06F 16/2453*  (2019.01)
*G06F 9/48*  (2006.01)

(52) U.S. Cl.
CPC ...... *G06F 16/24539* (2019.01); *G06F 9/4881* (2013.01); *G06F 16/24542* (2019.01)

(58) Field of Classification Search
CPC ..................... G06F 16/24539; G06F 16/24542
(Continued)

(56) References Cited

U.S. PATENT DOCUMENTS

| 6,510,422 B1 * | 1/2003 | Galindo-Legaria ......................... G06F 16/24542 |
| 2004/0122804 A1 * | 6/2004 | Zhang ............... G06F 16/24539 |

(Continued)

FOREIGN PATENT DOCUMENTS

| WO | 2006071830 A1 | 6/2006 |
| WO | 2017065887 A1 | 4/2017 |

OTHER PUBLICATIONS

"Microsoft Azure—SQL Database", Retrieved From https://azure.microsoft.com/en-us/services/sql-database/, Retrieved on: Apr. 20, 2018, 14 Pages.

(Continued)

*Primary Examiner* — Chelcie L Daye
(74) *Attorney, Agent, or Firm* — Rainier Patents, P.S.

(57) ABSTRACT

Described herein is a system and method for detecting and reusing overlapping computations. Overlapping subgraphs of the query are determined using a normalized signature for a particular subgraph that identifies a particular subgraph across recurring instances of data. A normalized signature for each overlapping subgraph for the determined overlapping subgraphs of the query is provided. For each overlapping subgraph determined to be materialized: whether or not the particular subgraph has been materialized is determined using a precise signature corresponding to a normalized signature of the particular overlapping subgraph. The precise signature identifies a particular subgraph corresponding to the normalized signature within a particular recurring instance of data. When the particular subgraph has not been materialized, the subgraph is materialized and used to respond to the query. When the particular subgraph has been materialized, the materialized subgraph is used to respond to the query.

20 Claims, 20 Drawing Sheets

(58) Field of Classification Search
USPC .......................................................... 707/717
See application file for complete search history.

(56) References Cited

U.S. PATENT DOCUMENTS

| | | | |
|---|---|---|---|
| 2006/0230017 | A1 | 10/2006 | Larson et al. |
| 2016/0292194 | A1* | 10/2016 | Farkash ................ G06F 16/221 |

OTHER PUBLICATIONS

"Microsoft Azure—Data Lake", Retrieved From https://azure.microsoft.com/en-us/solutions/data-lake/, Retrieved on: Apr. 20, 2018, 7 Pages.

Jindal, et al., "Selecting Subexpressions to Materialize at Datacenter Scale", Feb. 2018, 13 pages.

"International Search Report and Written Opinion Issued in PCT Application No. PCT/US19/024449", dated Jun. 19, 2019, 11 Pages.

"Amazon Athena", Retrieved From https://web.archive.org/web/20170912003651/https://aws.amazon.com/athena/, Sep. 12, 2017, 8 Pages.

"Amazon Relational Database Service", Retrieved From https://aws.amazon.com/rds/, Retrieved on: Feb. 20, 2018, 8 Pages.

"GDPR Portal: Site Overview", Retrieved From https://web.archive.org/web/20160506032626/https://www.eugdpr.org/, May 6, 2017, 1 Page.

"Google BigQuery", Retrieved From https://cloud.google.com/bigquery, Retrieved on: Feb. 20, 2018, 20 Pages.

"TPC-DS is a Decision Support Benchmark", Retrieved From http://www.tpc.org/tpcds, Retrieved on: Feb. 20, 2018, 1 Page.

Agarwal, et al., "Re-optimizing Data-Parallel Computing", In Proceedings of the 9th USENIX Conference on Networked Systems Design and Implementation, Apr. 25, 2012, pp. 1-14.

Agrawal, et al., "Automated selection of materialized views and indexes in SQL databases", In Proceedings of the 26th International Conference on Very Large Data Bases, Sep. 10, 2000, pp. 496-505.

Babu, et al., "Proactive Re-optimization", In Proceedings of the ACM SIGMOD international conference on Management of data, Jun. 14, 2005, pp. 107-118.

Boutin, et al., "Apollo: Scalable and coordinated scheduling for cloud-scale computing", In Proceedings of 11th USENIX Conference on Operating Systems Design and Implementation, Oct. 6, 2014, pp. 285-300.

Bruno, et al., "Continuous Cloud-Scale Query Optimization and Processing", In Proceedings of the VLDB Endowment, vol. 6, Issue 11, Aug. 26, 2013, pp. 961-972.

Camacho-Rodriguez, et al., "Reuse-based Optimization for Pig Latin", In Proceedings of the 25th ACM International on Conference on Information and Knowledge Management, Oct. 24, 2016, pp. 2215-2220.

Chaiken, et al., "SCOPE: Easy and Efficient Parallel Processing of Massive Data Sets", In Proceedings of the Very Large Data Bases Endowment, vol. 1, Issue 2, Aug. 24, 2008, pp. 1-12.

Elghandour, et al., "ReStore: Reusing results of MapReduce jobs", In Proceedings of the VLDB Endowment, vol. 5, Issue 6, Aug. 2012, pp. 586-597.

Giannikis, et al., "Shared workload optimization", In Proceedings of the VLDB Endowment, vol. 7, Issue 6, Sep. 2014, pp. 429-440.

Graefe, Goetz, "The Cascades Framework for Query Optimization", In Proceedings of the IEEE Data Engineering Bulletin, vol. 18, Issue 3, Sep. 1995, pp. 19-28.

Gu, et al., "Testing the Accuracy of Query Optimizers", In Proceedings of the Fifth International Workshop on Testing Database Systems, May 21, 2012, 6 Pages.

Gunda, et al., "Nectar: Automatic management of data and computation in datacenters", In Proceedings of the 9th USENIX conference on Operating systems design and implementation, Oct. 4, 2010, 14 Pages.

Gupta, et al., "Selection of views to materialize in a data warehouse", In Journal of IEEE Transactions on Knowledge and Data Engineering, vol. 17, Issue 1, Jan. 2005, pp. 24-43.

Halevy, Alon Y., "Answering Queries Using Views: A Survey", In International Journal on Very Large Data Bases, vol. 10, Issue 4, Dec. 2001, pp. 270-294.

Halevy, et al., "Goods: Organizing Google's Datasets", In Proceedings of the International Conference on Management of Data, Jun. 26, 2016, pp. 795-806.

Harinarayan, et al., "Implementing data cubes efficiently", In Proceedings of the ACM SIGMOD international conference on Management of data, Jun. 4, 1996, pp. 205-216.

Ivanova, et al., "An architecture for recycling intermediates in a column-store", In Proceedings of the ACM SIGMOD International Conference on Management of data, Jun. 29, 2009, pp. 309-320.

Jindal, et al., "Computation Reuse in Analytics Job Service at Microsoft", In Proceedings of International Conference on Management of Data, Mar. 2018, 13 Pages.

Jyothi, et al., "Morpheus: Towards automated SLOs for enterprise clusters", In Proceedings of the 12th USENIX conference on Operating Systems Design and Implementation, Nov. 2, 2016, 18 Pages.

Kabra, et al., "Efficient Mid-Query Re-Optimization of Sub-Optimal Query Execution Plans", In Proceedings of the ACM SIGMOD International Conference on Management of Data, Jun. 1, 1998, pp. 106-117.

Karanasos, et al., "Dynamically optimizing queries over large scale data platforms", In Proceeding of ACM SIGMOD International Conference on Management of Data, Jun. 22, 2014, pp. 943-954.

Kunjir, et al., "ROBUS: Fair Cache Allocation for Data-parallel Workloads", In Proceedings of the ACM International Conference on Management of Data, May 14, 2017, pp. 219-234.

Leis, et al., "How Good Are Query Optimizers, Really?", In Proceedings of the VLDB Endowment, vol. 9, Issue 3, Nov. 2015, pp. 204-215.

Liu, et al., "Kodiak: Leveraging materialized views for very low-latency analytics over high-dimensional web-scale data", In Proceedings of the VLDB Endowment, vol. 9, Issue 13, Sep. 2016, pp. 1269-1280.

Lohman, Guy, "Is Query Optimization a "Solved" Problem?", Retrieved From http://wp.sigmod.org/?p=1075, Apr. 10, 2014, 11 Pages.

Makreshanski, et al., "MQJoin: Efficient shared execution of main-memory joins", In Proceedings of the VLDB Endowment, vol. 9, Issue 6, Jan. 2016, pp. 480-491.

Mami, et al., "A survey of view selection methods", In Newsletter of ACM SIGMOD Record, vol. 41, Issue 1, Mar. 2012, pp. 20-29.

Markl, et al., "Robust Query Processing through Progressive Optimization", In Proceedings of the ACM SIGMOD International Conference on Management of Data, Jun. 13, 2004, 12 Pages.

Mavlyutov, et al., "Dependency-Driven Analytics: A Compass for Uncharted Data Oceans", In Proceedings of 8th Biennial Conference on Innovative Data Systems Research, Jan. 8, 2017, 9 Pages.

Nagel, et al., "Recycling in pipelined query evaluation", In Proceedings of IEEE 29th International Conference on Data Engineering, Apr. 8, 2013, 12 Pages.

Nykiel, et al., "MRShare: sharing across multiple queries in MapReduce", In Proceedings of the VLDB Endowment vol. 3, Issue 1-2, Sep. 13, 2010, 12 Pages.

Perez, et al., "History-aware query optimization with materialized intermediate views", In Proceedings of IEEE 30th International Conference on Data Engineering, Mar. 31, 2014, pp. 520-531.

Qiao, et al., "Main-memory scan sharing for multi-core CPUs", In Proceedings of the VLDB Endowment, vol. 1, Issue 1, Aug. 2008, pp. 610-621.

Roy, et al., "Efficient and extensible algorithms for multi query optimization", In Proceedings of the ACM SIGMOD International conference on Management of data, May 15, 2000, pp. 249-260.

Sellis, Timos K., "Multiple-query optimization", In Journal of ACM Transactions on Database Systems, vol. 13, Issue 1, Mar. 1988, pp. 23-52.

(56) References Cited

OTHER PUBLICATIONS

Sen, et al., "Bootstrapping Privacy Compliance in Big Data Systems", In Proceedings of IEEE Symposium on Security and Privacy, May 18, 2014, pp. 327-342.

Silva, et al., "Exploiting common subexpressions for cloud query processing", In Proceedings of the IEEE 28th International Conference on Data Engineering, Apr. 1, 2012, 12 Pages.

Stillger, et al., "LEO—DB2's LEarning Optimizer", In Proceedings of the 27th International Conference on Very Large Data Bases, Sep. 11, 2001, 10 Pages.

Theodoratos, et al., "Data warehouse configuration", In Proceedings of 23rd Conference on Very Large Data Bases, vol. 97, Aug. 25, 1997, pp. 126-135.

Thusoo, et al., "Hive: a warehousing solution over a map-reduce framework", In Proceedings of the VLDB Endowment vol. 2, Issue 2, Aug. 2009, pp. 1626-1629.

Wang, et al., "CoScan: Cooperative Scan Sharing in the Cloud", In Proceedings of the 2nd ACM Symposium on Cloud Computing, Oct. 26, 2011, 12 Pages.

Wang, et al., "Multi-query optimization in mapReduce framework", In Proceedings of the VLDB Endowment, vol. 7, Issue 3, Nov. 2013, pp. 145-156.

Zhou, et al., "Efficient exploitation of similar subexpressions for query processing", In Proceedings of the ACM SIGMOD international conference on Management of data, Jun. 12, 2007, pp. 533-544.

Zhou, et al., "SCOPE: parallel databases meet MapReduce", In International Journal on Very Large Data Bases, vol. 21, Issue 5, Oct. 2012, pp. 611-636.

Zukowski, et al., "Cooperative scans: Dynamic bandwidth sharing in a DBMS", In Proceedings of the 33rd International conference on Very large data bases, Sep. 23, 2007, pp. 723-734.

\* cited by examiner

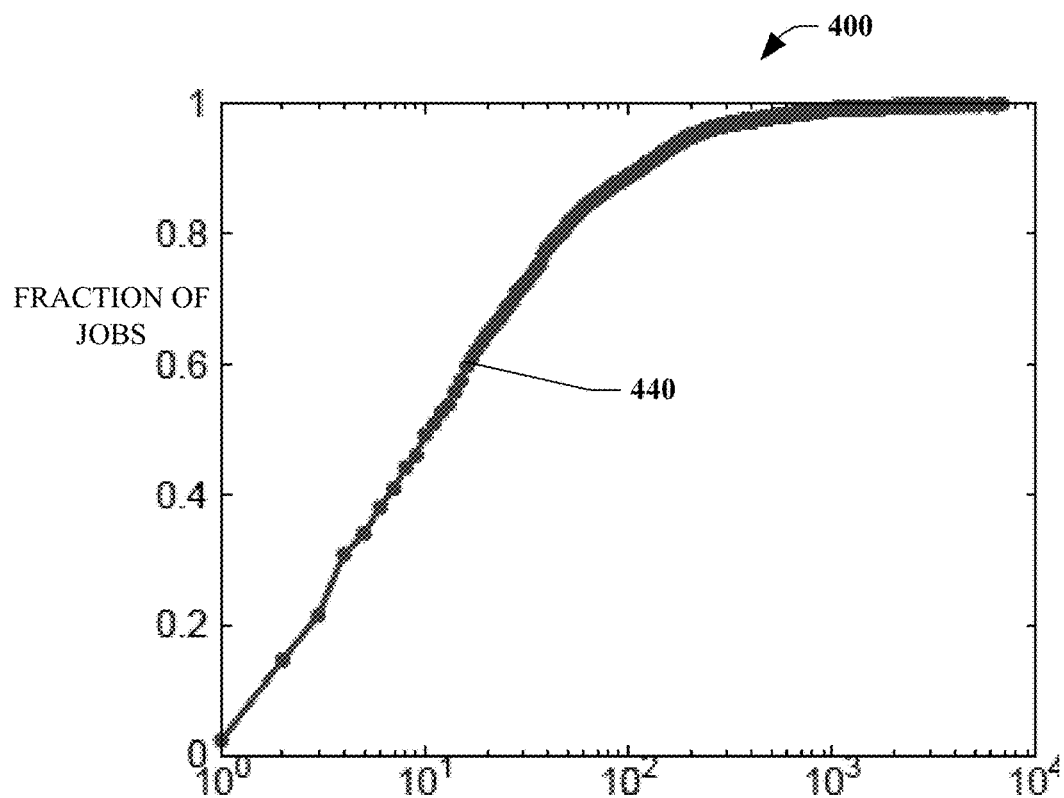
(a) Overlap by jobs  FIG. 4A
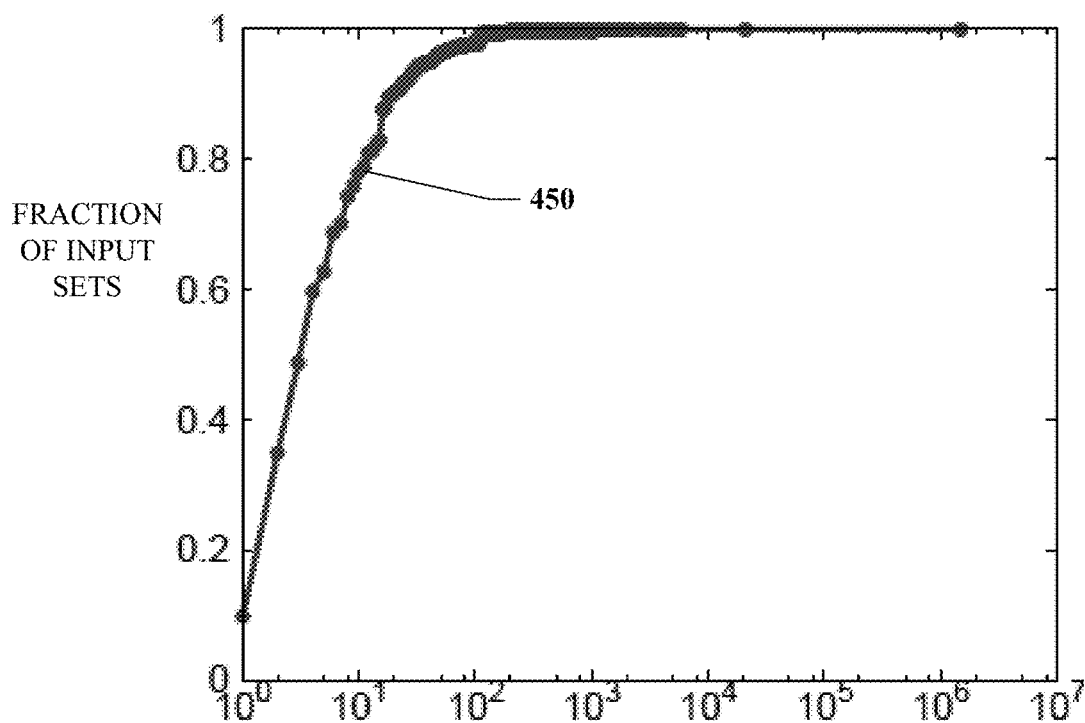
(b) Overlap by inputs  FIG. 4B (c) Overlap by users (d) Overlap by VCs (a) Operator breakdown (b) Shuffle

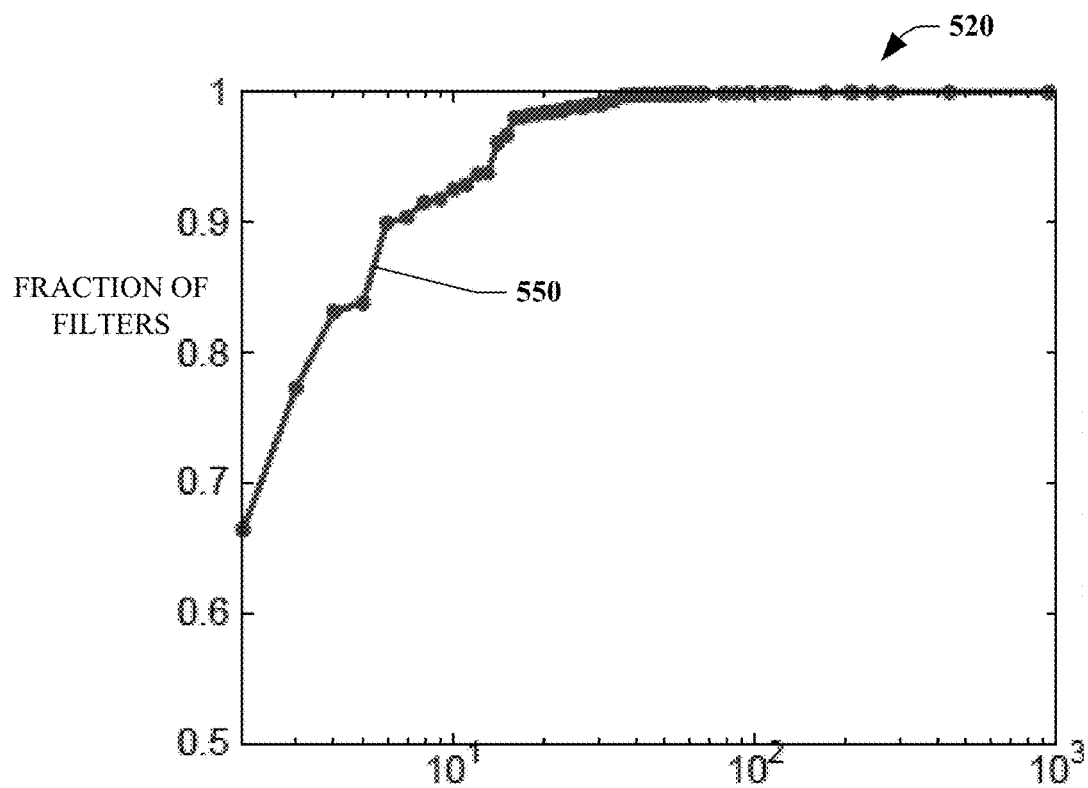
(c) Filter    FIG. 5C
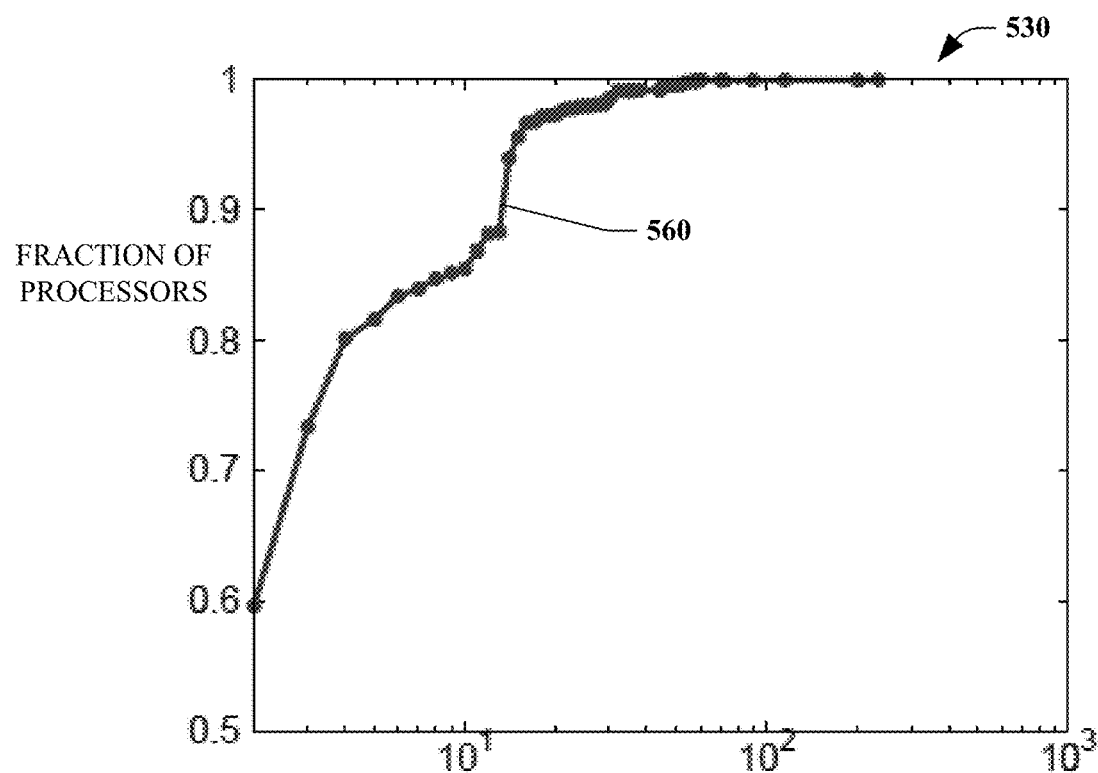
(d) Processor    FIG. 5D

(c) Size (GB)

(d) View-Query Cost Ratio

COMPUTATION REUSE IN ANALYTICS JOB SERVICE

BACKGROUND

Shared analytics clusters have become the de facto way for large organizations to analyze and gain insights over their data. Often, a cluster is comprised of tens of thousands of machines, storing exabytes of data, and supporting thousands of users, collectively running hundreds of thousands of batch jobs daily.

With shared analytics clusters, significant overlaps can be observed in the computations performed by the submitted jobs. Naively computing the same job subexpressions multiple times wastes cluster resources, which has a detrimental effect on the cluster's operational costs.

SUMMARY

Described herein is a system for automatically reusing overlapping computations in an analytics job service: a computer comprising a processor and a memory having computer-executable instructions stored thereupon which, when executed by the processor, cause the computer to: receive a query; determine overlapping subgraphs of the query using stored information regarding analyzed workload data, the stored information including a normalized signature for a particular subgraph, the normalized signature identifies a particular subgraph across recurring instances of data; provide information regarding the determined overlapping subgraphs of the query, the information regarding overlapping subgraphs comprising a normalized signature for each overlapping subgraph; using the provided information, determine which of the overlapping subgraphs is to be materialized; for each overlapping subgraph determined to be materialized: determine whether or not the particular subgraph has been materialized using a precise signature corresponding to a normalized signature of the particular overlapping subgraph, the precise signature identifies a particular subgraph corresponding to the normalized signature within a particular recurring instance of data; when the particular subgraph has not been materialized, materialize the subgraph and use the materialized subgraph to respond to the query; and, when the particular subgraph has been materialized, use the materialized subgraph to respond to the query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4D are graphs that illustrate the overlapping computations from virtual clusters in a particular business unit.

FIG. 5C is a bar graph that illustrates a cumulative distribution for the filter operator.

FIG. 5D is a bar graph that illustrates a cumulative distribution for user-defined processors.

DETAILED DESCRIPTION

Figure 1:
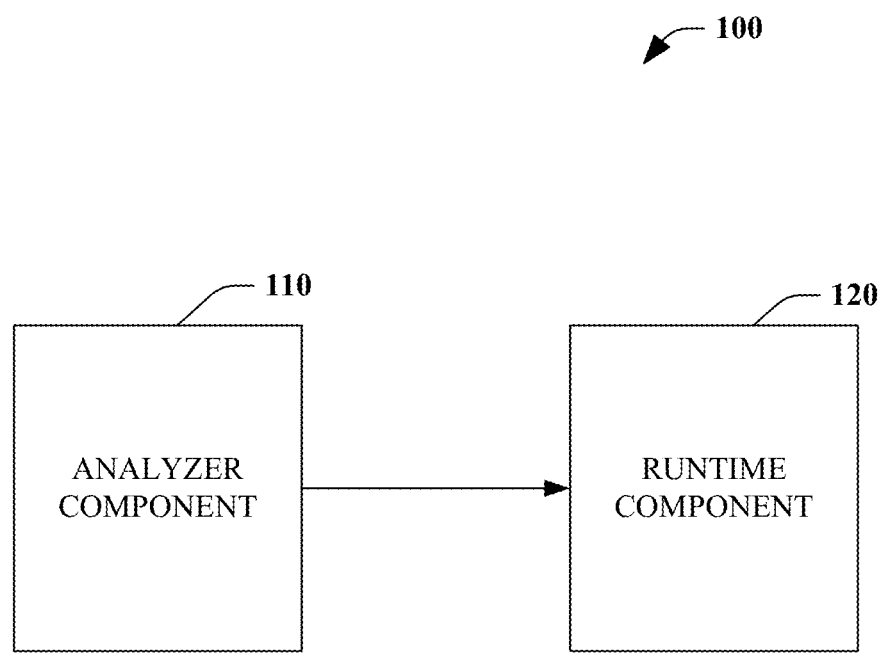
FIG. 1 is a functional block diagram that illustrates a system for automatically detecting and reusing overlapping computations in an analytics job service.

Various technologies pertaining automatically detecting and reusing overlapping computations in an analytics job service are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding automatically detecting and reusing overlapping computations in an analytics job service. What follows are one or more exemplary systems and methods.

Aspects of the subject disclosure pertain to the technical problem of detecting and reusing overlapping computations in an analytics job service. The technical features associated with addressing this problem involve determining overlapping subgraphs of the query using stored information regarding analyzed workload data, the stored information including a normalized signature for a particular subgraph, the normalized signature identifies a particular subgraph across recurring instances of data; providing information regarding the determined overlapping subgraphs of the query, the information regarding overlapping subgraphs comprising a normalized signature for each overlapping subgraph; using the provided information, determining which of the overlapping subgraphs to be materialized; for each overlapping subgraph determined to be materialized: determining whether or not the particular subgraph has been materialized using a precise signature corresponding to a normalized signature of the particular overlapping subgraph, the precise signature identifies a particular subgraph corresponding to the normalized signature within a particular recurring instance of data; when the particular subgraph has not been materialized, materialize the subgraph and use the materialized subgraph to respond to the query; and, when the particular subgraph has been materialized, use the materialized subgraph to respond to the query. Accordingly, aspects of these technical features exhibit technical effects of more efficiently and effectively providing a response to a query, for example, reducing utilization of computing resource(s) and/or reducing query response time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

There is a recent trend of offering analytics-as-a-service, also referred to simply as job service, by major cloud providers. These services are motivated by the fact that setting up and running data analytics can be a major hurdle for enterprises. Although platform as a service (PaaS), software as a service (SaaS), and more recently database as a service (DBaaS) have eased the pain of provisioning and scaling hardware and software infrastructures, users are still responsible for managing and tuning their servers. A job service mitigates this pain by offering server-less analytics capability that does not require users to provision and manage servers. Instead, the cloud provider takes care of managing and tuning a query engine that can scale instantly and on demand. Users can get started quickly using the all familiar SQL interface and pay only for the processing used for each query, in contrast to paying for the entire provisioned server infrastructure irrespective of the compute resources actually used.

Described herein is a computation reuse framework that can be used to address the computation overlap problem in a job service. In some embodiments, aspects of the framework can include one or more of the following: (i) computations are reused by creating materialized views over recurring workloads, for example, periodically executing jobs that have the same script templates but process new data each time, (ii) the views to materialize are selected using a feedback loop that reconciles the compile-time and run-time statistics and gathers precise measures of the utility and cost of each overlapping computation, and/or (iii) materialized views are created in an online setting, for example, where there is no offline phase to select and/or materialize the overlapping computations.

Next, referring to FIG. 1, a system for automatically detecting and reusing overlapping computations in an analytics job service 100 is illustrated. In some embodiments, the system 100 comprises an end-to-end system for computation reuse in a job service. The system 100 includes an analyzer component 110 and a runtime component 120, which are discussed in greater detail below. In some embodiments, the analyzer component 110 is an offline component with respect to jobs which use its output, while the runtime component 120 is an online component with respect to those jobs. In some embodiments, the analyzer component 110 runs periodically.

The analyzer component 110 established a feedback loop to select the most interesting subgraphs to materialize and reuse. In some embodiments, the analyzer component 110 captures a set of interesting computations to reuse based on their prior run(s), plugs-in custom view selection methods to select the view to materialize given a set of constraints, picks the physical design for the materialized views, and/or mines an expiry of each of the materialized views. In some embodiments, information can be provided by the analyzer component 110 as query annotations. In some embodiments, the analyzer component 110 is trigger by an administrator interface. In some embodiments, analysis by the analyzer component 110 is performed only with express consent (e.g., opt-in) of an entity associated with the workload information.

The runtime component 120 facilitates online computation reuse using query annotations provided by the analyzer component 110. As discussed in greater detail below, the runtime component 120 can include a metadata service component to fetch the metadata of computations relevant for reuse in a given job, an online view materialization mechanism as part of the job execution, a synchronization mechanism to avoid materializing the same view in parallel, making materialized views available early during runtime, automatic query rewriting using materialized views, and/or job coordination hints to maximize the computation reuse.

Introduction

Given the shift in cloud pricing, from provisioned resources to actually consumed resources, enterprises naturally do not want to duplicate their resource consumption and pay redundant dollar costs. However, this is a major challenge in modern enterprise data analytics which includes complex data pipelines written by several users, where parts of the computations end up running over and over again. Such computation overlap not only adds to the dollar cost, but in, some embodiments, it can also be difficult for the developers and/or the administrators to detect these overlaps across different scripts and/or different users.

Figure 2:
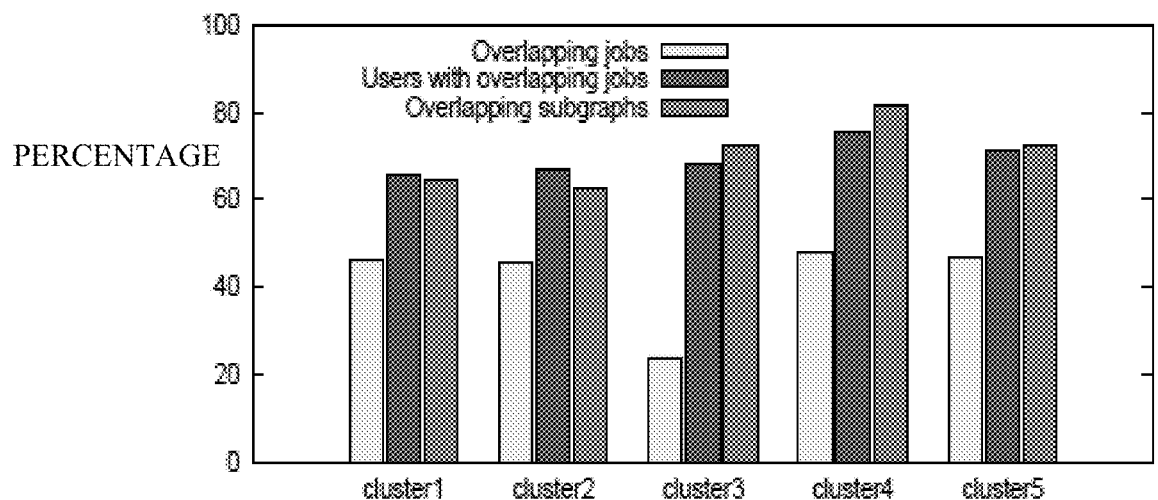
FIG. 2 is a bar graph that illustrates overlap in five exemplary clusters.

To illustrate the problem, consider an exemplary system utilizing data analytics deployed over hundreds of thousands of machines, running hundreds of thousands of production analytic jobs per day that are written by thousands of developers, processing several exabytes of data per day, and involving several hundred petabytes of I/O. In some embodiments, almost 40% of the daily jobs were observed to have computation overlap with one or more other jobs. It was further observed that there are more than 10 million overlapping subgraphs (appearing at least twice), with an average overlap frequency of 3.9. These overlaps are incurred by 70% of the total user entities (e.g., humans and machines) on these clusters. FIG. 2 is a bar graph 200 that illustrates, from left to right, overlapping jobs, users with overlapping jobs and overlapping subgraphs for five exemplary clusters. It can be observed that all clusters, except cluster3, have more than 45% of their jobs overlapping. Likewise, more than 65% of users on all clusters end up having computation overlap in their jobs and the percentage of subgraphs appearing at least twice could be as high as 80%. While the ideal solution would be for the users to modularize their code and reuse the shared set of scripts and intermediate data, this is not possible in practice as users are distributed across teams, job functions, as well as geographic locations. Thus, an automatic cloud-scale approach to computation reuse in a job service, as described herein, is desired.

There are a number of challenges in building a computation reuse framework for an analytics job service. First, enterprise data analytics often includes recurring jobs over changing data. In some embodiments, the analytics job service has more than 60% of the jobs in its key clusters as recurrent. With these recurring jobs, scheduling and smartly materializing views over the new data can be significant which was not an issue in traditional view selection. There was incremental maintenance, but here that would not work, because data might be completely new. In some embodiments, analytics job service jobs are further packed in tight data pipelines, i.e., multiple jobs operate in a given time interval with strict completion deadlines. Tight data pipelines leave little room to analyze the recurring workload over the new data in each recurrence. Second, in some embodiments, a feedback loop is needed to be established to analyze the previously executed workload and detect overlapping computations. Given the large volume of overlaps, materializing all of the overlapping subgraphs for reuse is simply not practical. Selection of the interesting overlaps (or views) can depend on the utility and cost of each overlap, i.e., the runtime savings and the storage cost of each overlap. Unfortunately, however, the optimizer estimates for utility and costs are often significantly wrong due to a variety of factors (e.g., unstructured data, inaccurate operator selectivities, presence of user code). Thus, in some embodiments, the feedback loop, as provided by the analyzer component 110, reconciles the logical query trees with the actual runtime statistics to get more precise measures of utility and cost of each overlap.

Third, in some embodiments, a job service is online (e.g., always available) and there is no offline phase available to create the materialized views, which is expected with traditional materialized views. Halting and/or delaying recurring jobs to create materialized views is generally not an option, as it carries the risk of not meeting the completion deadlines and/or affecting downstream data dependency. Thus, in some embodiments, materialized views are created just-in-time (e.g., in response to a query) and with minimal overheads. In some embodiments, this can be further complicated by the fact that multiple jobs can now compete to build views (build-build interaction), and they depend on each other for the availability of views (build-consume interaction).

In some embodiments, the systems and methods described herein provide an end-to-end system for computation reuse that has a number of requirements, including automatic reuse and transparency to the end users, that are inspired from production environments. In some embodiments, users can write their jobs just as before, i.e., zero changes to user scripts, with the system 100 automatically detecting and reusing computations. In some embodiments, exact job subgraph matches are focused upon, given that exact matches are plentiful and it makes the problem much simpler without getting into view containment complexities.

In some embodiments, the system 100 takes into account the physical design of the materialized view, as it was observed that computation overlaps often occur at shuffle boundaries. In some embodiments, the system 100 enables computation reuse over recurring jobs through a combination of normalized signatures and precise signatures (e.g., hashes) for computation subgraphs. The normalized signature matches computations across recurring instances (e.g., independent of a particular instance of data), while the precise signature matches computations within a recurring instance (e.g., specific to a particular instance of data). In some embodiments, together these two signatures enable the system 100 to analyze the workload once and reuse overlapping computations repeatedly.

The Reuse Opportunity

In some embodiments, overlap can be analyzed at different granularity levels: overlap within a cluster, overlap within a business unit, and/or operator-wise overlap.

Overlap within a Cluster

Figure 3A:
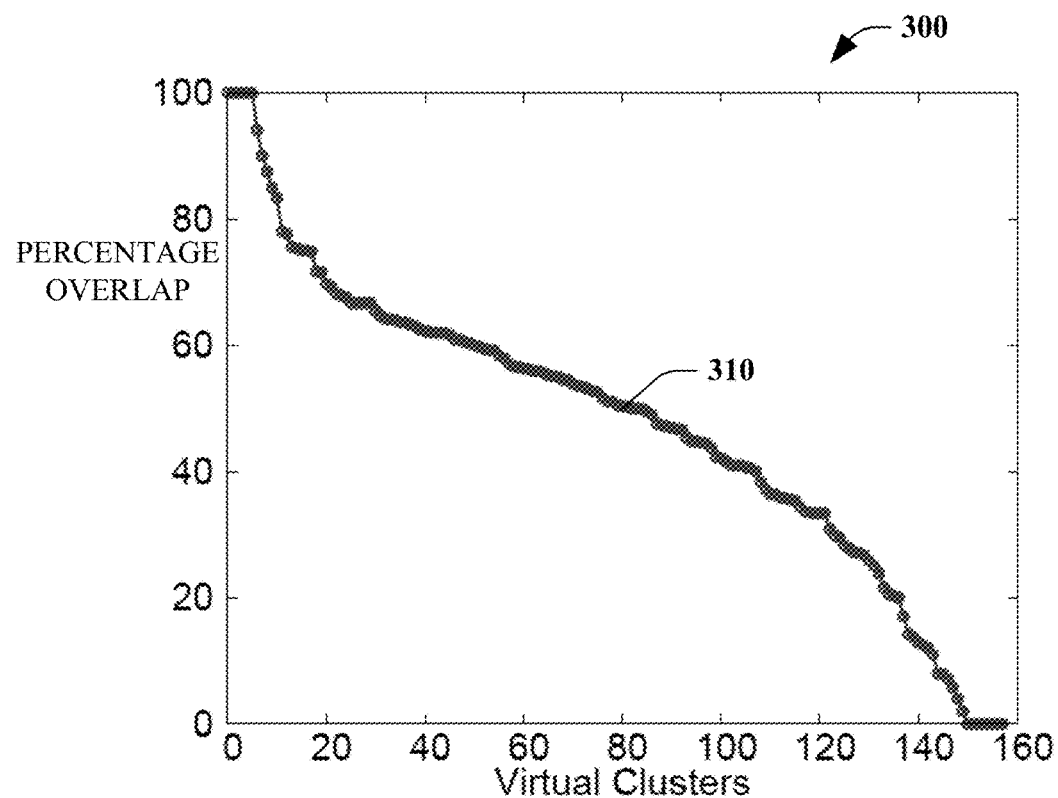
FIG. 3A is a graph that illustrates a distribution of percentage change in each of a plurality of virtual clusters of a particular physical cluster.
Figure 3B:
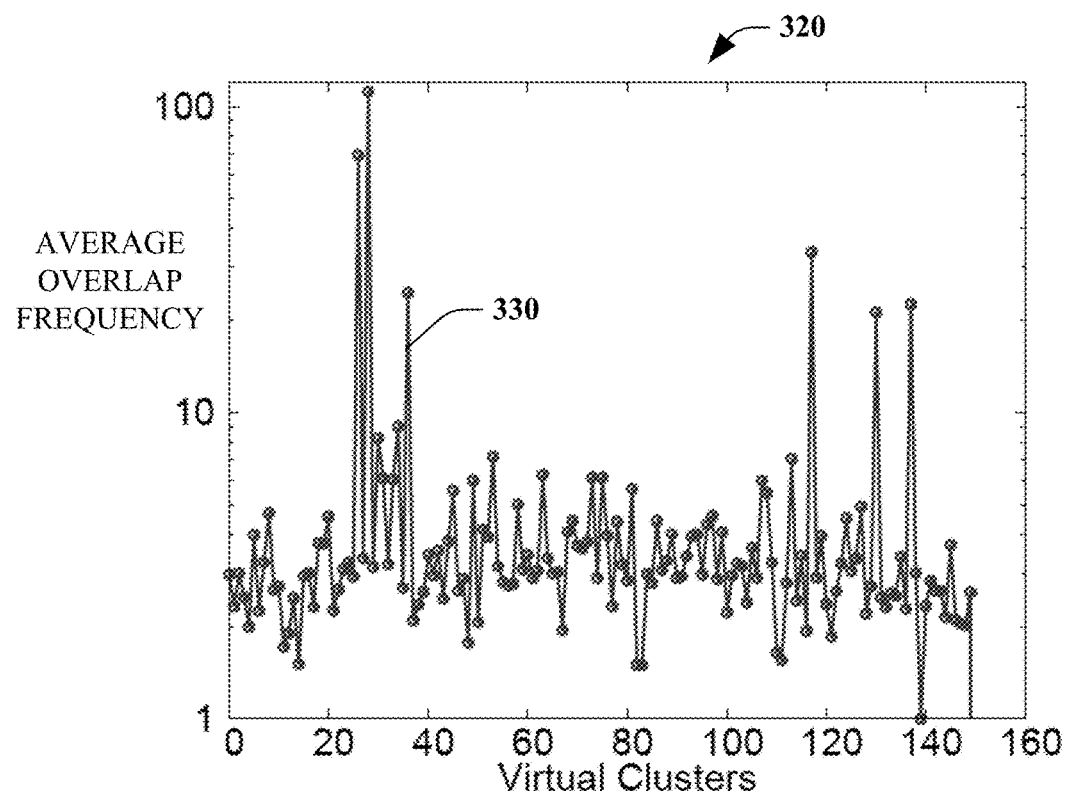
FIG. 3B is a graph that illustrates a distribution of the average overlap frequencies across different virtual clusters.
Figure 4C:
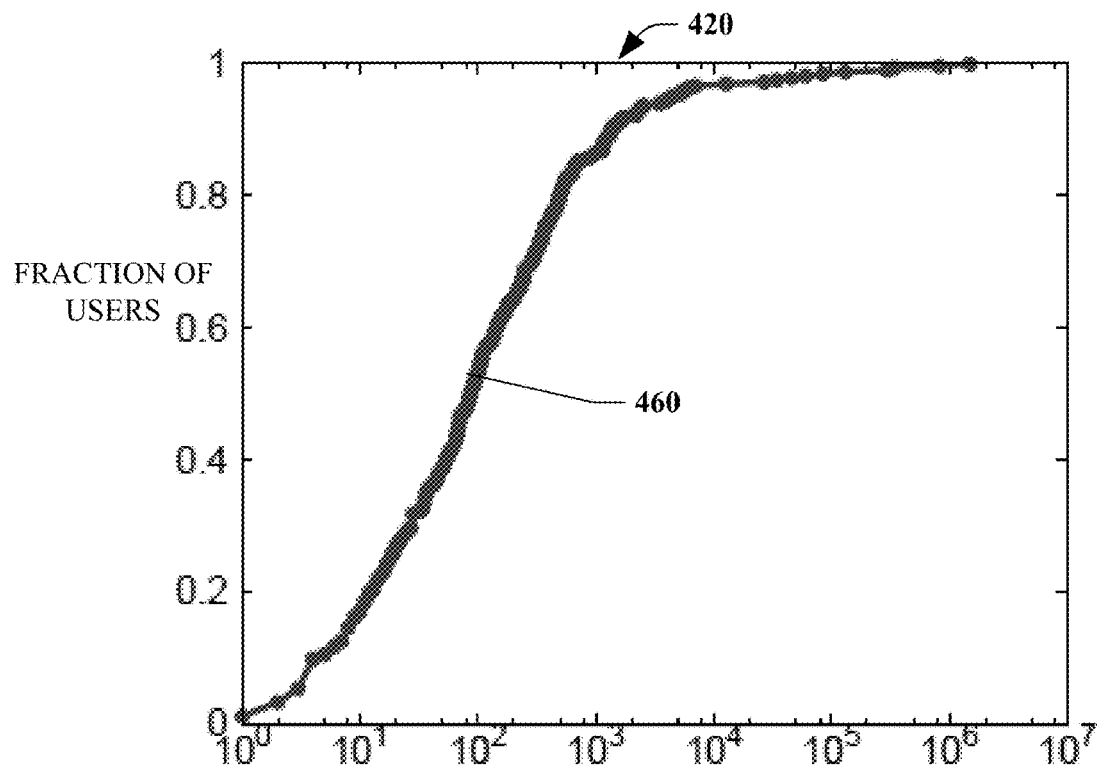
Figure 4D:
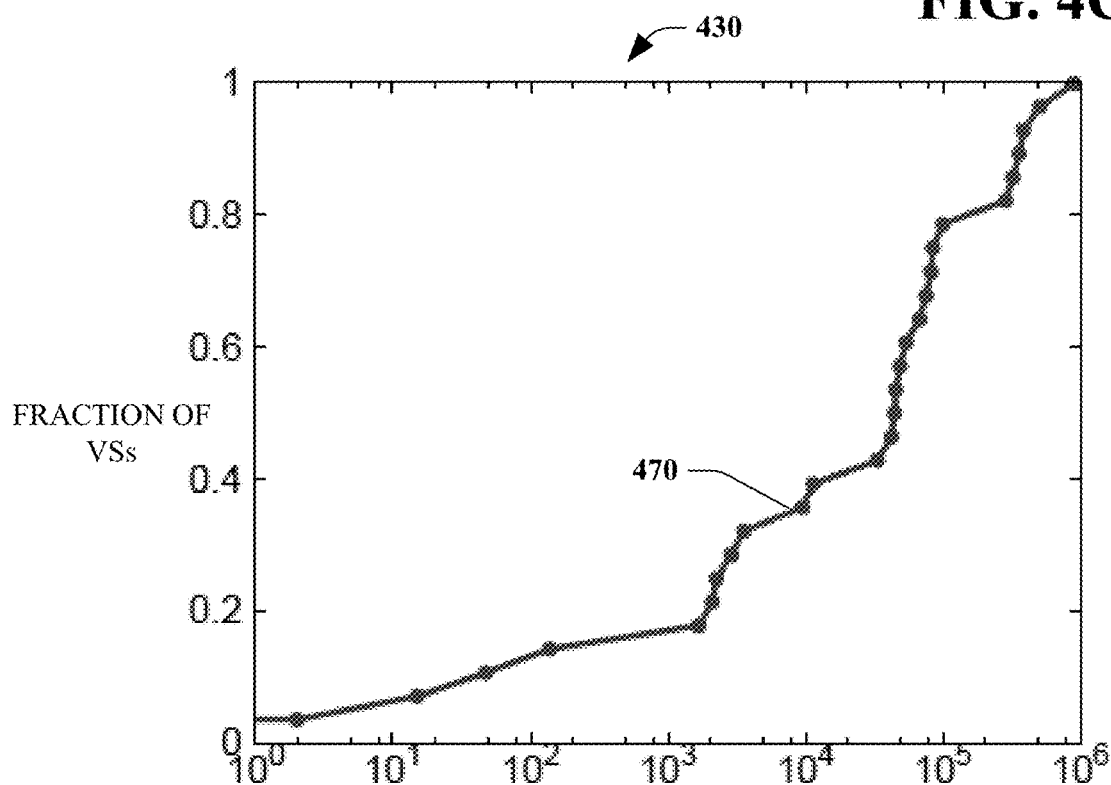

FIG. 3A is a graph 300 illustrating a distribution 310 of percentage change in each of a plurality of virtual clusters (VCs) of a particular physical cluster. A virtual cluster is a tenant having allocated computer capacity, referred to as "tokens", and controlling access privileges to its data. For these exemplary virtual clusters, analysis shows that while 8 VCs have no overlapping jobs, 54% of the VCs have more than 50% of their jobs overlapping, and 6 VCs have 100% of their jobs overlapping. FIG. 3B is a graph 320 illustrating a distribution 330 of the average overlap frequencies across the different virtual clusters. In this example, the average overlap frequency ranges from 1.5 to 112 (median frequency 2.96, 75th percentile 3.82, 95th percentile 7.1). This example demonstrates that computation overlap is a cluster-wide phenomenon and not generally limited to specific VCs or workloads.

In some embodiments, interactions with analytics job service customers reveal two main reasons for the prevalence of computation overlap seen above: (i) users rarely start writing their analytics scripts from scratch, rather they start from other peoples' scripts and extend/modify them to suit their purpose, and (ii) there is a data producer/consumer model involved in the analytics job service, where multiple different consumers process the same inputs (e.g., generated by the producers), and they often end up duplicating the same (partial or full) post-processing over those inputs.

Overlap within a Business Unit

FIGS. 4A-4D are graphs 400, 410, 420, 430 illustrating the overlapping computations from all VCs in a particular business unit. Note that business unit is a meaningful granularity because VCs within a business unit create a data pipeline, with some VCs producing the data (producers) and some VCs processing the downstream data (consumers).

FIGS. 4A-4D illustrate, respectively, the cumulative distributions 440, 450, 460, 470 of per-job, per-input, per-user, and per-VC overlaps. Surprisingly, it can be observed that most of the jobs have 10 s to 100 s of subgraphs that overlap with one or more other jobs. In some embodiments, this suggests that there are significant opportunities to improve the data pipelines in order to reduce the redundancy. Apart from reusing computations, in some embodiments, sharing computations in the first place can also be considered. A similar observation can be made from per-input overlap distribution 450, where it can be observed that more than 90% of the inputs are consumed in the same subgraphs at least twice, 40% are consumed at least five times, and 25% are consumed at least ten times. In terms of users (FIG. 4C, distribution 460), it can be observed again that 10s to 100s of overlaps per user occur, with the top 10% having more than 1500 overlaps. In some embodiments, these heavy hitters could be consulted separately. Lastly, for VCs (FIG. 4D, distribution 470), it can be observed that at least three groups have similar numbers of overlaps. Overall, computation overlap is widespread across jobs, inputs, users, and VCs, and can be addressed in a systematic manner by the system 100.

Operator-wise Overlap

Figure 5A:
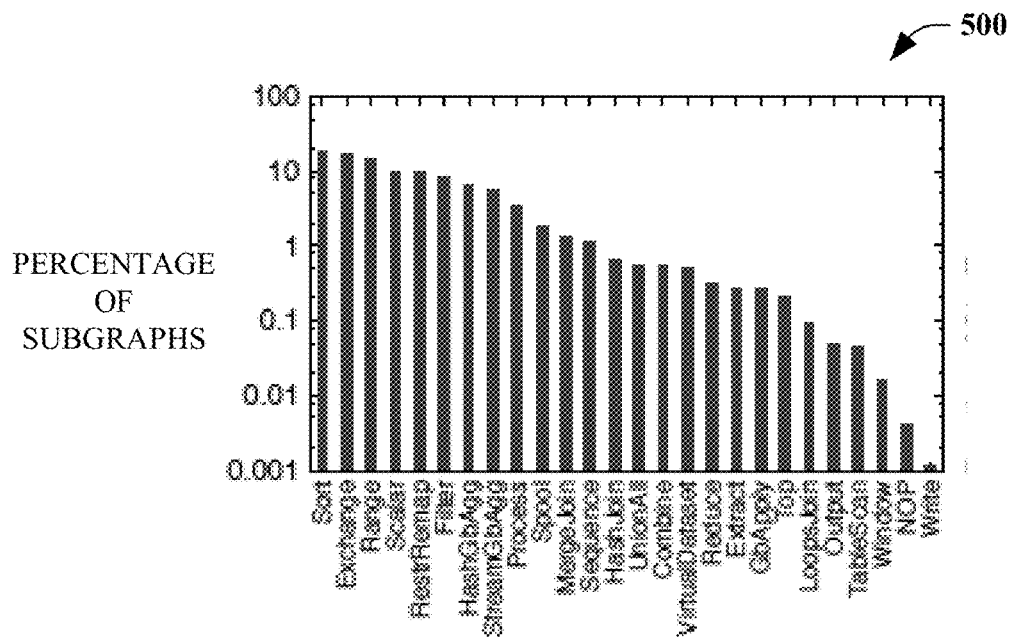
FIG. 5A is a bar graph that illustrates percentage of subgraphs for a plurality of operators for the overlaps shown in FIGS. 4A-4D.

Operator-wise overlap refers to the root operator of the overlapping computation subgraph. FIG. 5A is a bar graph 500 illustrating percentage of subgraphs for a plurality of operators for the overlaps shown in FIGS. 4A-4D. It can be observed that "sort" and "exchange" (shuffle) comprise the top two most overlapping computations. In some embodiments, this can be interesting because these two are typically the most expensive operations as well and so it would make sense to reuse these. In contrast, the next three most overlapping operators, namely "Range" (scan), "ComputeScalar", and "RestrRemap" (usually column remapping), are expected to be much cheaper to re-evaluate, since they are closer to the leaf-level in a query tree. In some embodiments, among other operators of interest, it can be observed that group-by aggregate, joins, and user defined functions (including process, reduce, and even extractors) have significant overlaps.

Figure 5B:
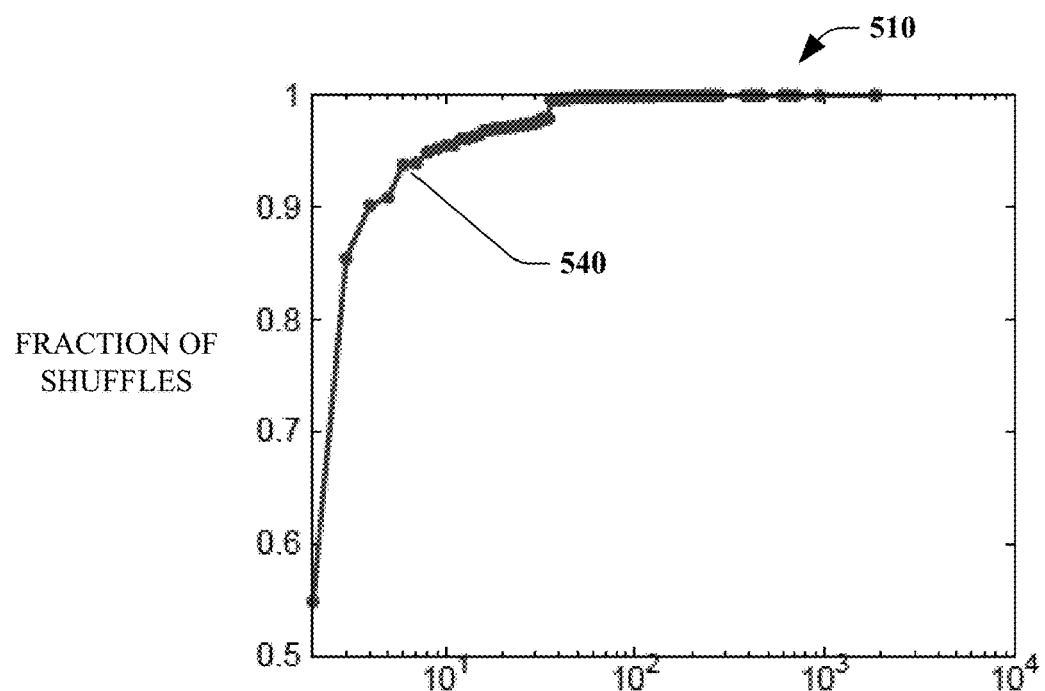
FIG. 5B is a bar graph that illustrates a cumulative distribution for the shuffle operator.

FIGS. 5B-5D are graphs 510, 520, 530 showing the cumulative overlap distribution for three of the operators, namely shuffle (distribution 540), filter (distribution 550), and user-defined processor (distribution 560). Even though it was observed that the shuffle operator had a high quantity of overlapping computations, only a small fraction of the shuffles have high frequency. This changes for the filter operator, where the cumulative distribution is more linear, meaning that more filters have a higher frequency. Finally, for user defined operators in FIG. 5D (distribution 560), the curve is flatter. In some embodiments, this is because user-defined operators are likely to be shared as libraries by several users and teams.

Impact of Overlap

As discussed above, the computation overlaps occur in different clusters, VCs, and operators. The impact of these overlaps can be reviewed along several dimensions. FIGS. 6A-6D are graphs 600, 610, 620, 630 that quantify the impact of overlap in a particular business unit. The graphs 600, 610, 620, 630, respectively, illustrate cumulative distributions of frequency 640, runtime 650, output size 660, and view-to-query cost ratio 670 of the overlapping computations in one of the particular business unit (discussed above).

Figure 6A:
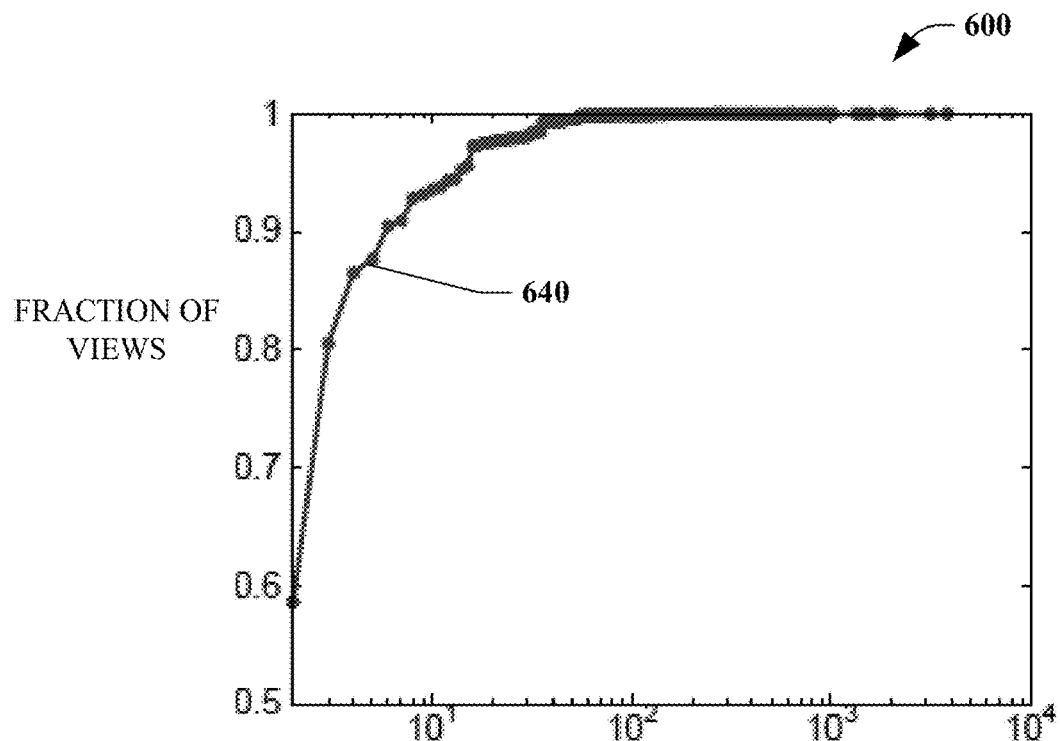
FIGS. 6A-6D are graphs that quantify the impact of overlap in a particular business unit.
Figure 6B:
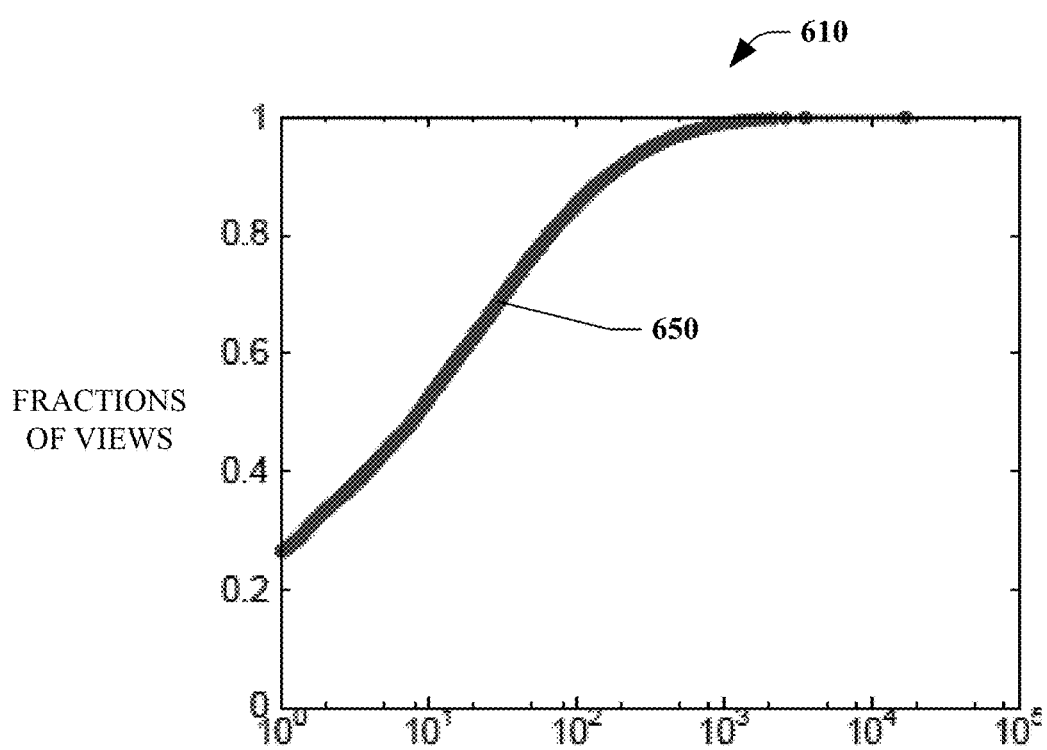
Figure 6C:
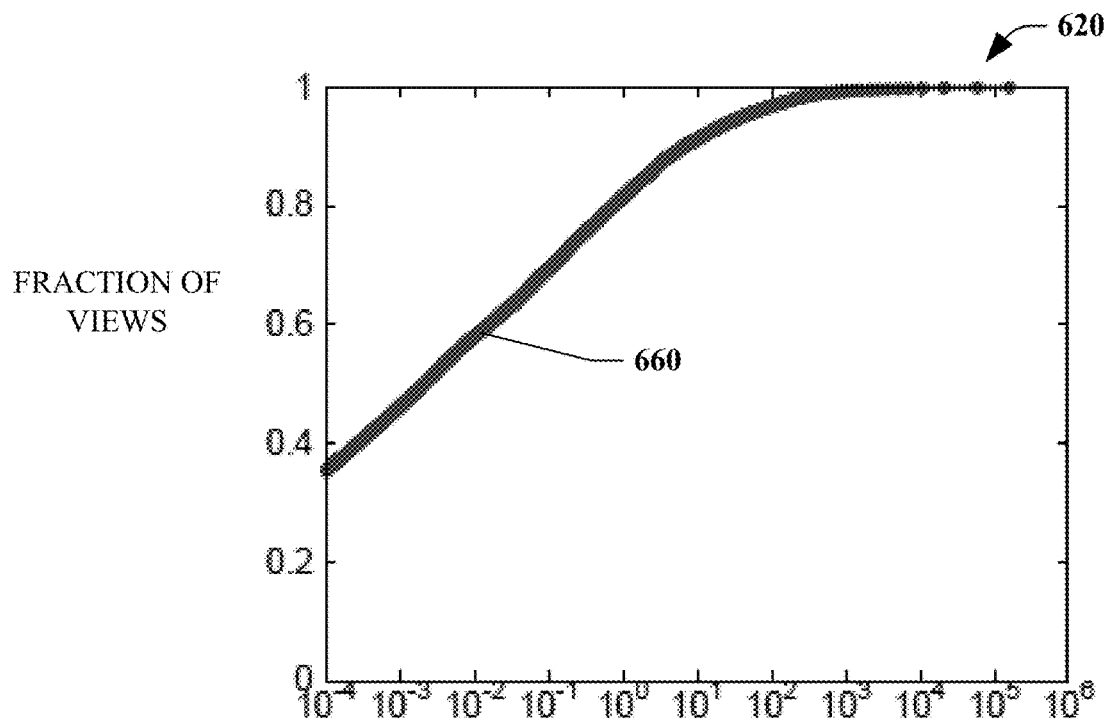
Figure 6D:
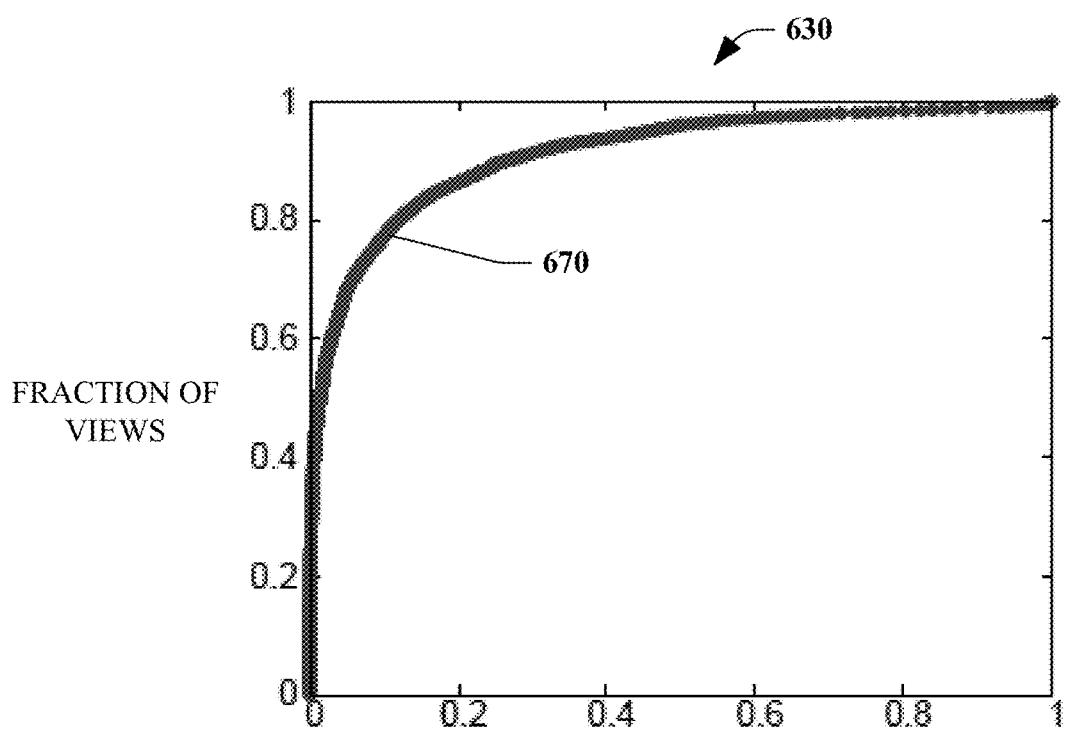

In terms of frequency, for a single day, there are 826,528 computations appearing at least twice, with 56,500 appearing at least 10 times, 587 appearing at least 100 times, and 16 appearing at least 1000 times. Referring to FIG. 6A, the distribution 640 illustrates the average overlap frequency however is 4.2 (median frequency is 2, 75th percentile is 3, 95th percentile is 14, and 99th percentile is 36). Thus, in some embodiments, computation overlap frequencies are heavily skewed and care needs to be exercised in selecting views to materialize. In contrast to the frequency, the runtime distribution 650 of FIG. 6B and the output size distributions 660 of FIG. 6C have much less skew. Interestingly, 26% of the overlaps have runtime of is or less, indicating there are opportunities to prune many of the reuse candidates, while 99% of the overlaps have runtime below 1000 s. In terms of output size, 35% of the overlaps have size below 0.1 MB, which is better (in case they are useful) for storage space, and 99% have size below 1 TB. Lastly, the view-to-query cost ratio illustrated in distribution 670 of FIG. 6D is an interesting metric to understand the relative importance of a view to a query. It can be observed that 46% of the overlapping computations have a view-to-query cost ratio of 0.01 (1%) or less. These overlaps will not result in significant savings in latency, although their cumulated resource consumption savings may still be of interest to a particular customer. Overall, this is again a highly skewed distribution with only 23% of the overlaps having a view-to-query cost ratio of more than 0.1, and just 4% having a ratio of more than 0.5.

Reuse Over Recurring Workloads

In some embodiments, the system 100 is used to materialize overlapping computations over recurring jobs in an analytics job service, for example, for jobs that appear repeatedly (e.g., hourly, daily, weekly, and/or monthly), have template changes in each instance, and/or operate over new data each time. Conventional systems have required the workload to be known a priori in order to analyze the workload and select the views to materialize. However, with recurring jobs changing and running over new data in each instance, the exact workload is not available until the next recurring instance, e.g., the next hour, day, week, month. Thus, in some embodiments, running the workload analysis to select the views to materialize within the same recurring instance, before running the actual jobs, is simply not practical.

In some embodiments, to handle recurring jobs, a combination of two signatures is collected for each subgraph computation: one which identifies the computation precisely and one which normalizes the precise signature by the recurring changes, e.g., data/time predicates, input names. In some embodiments, any updates in input data results in a different precise signature, thus automatically invalidating any older materialized view for reuse. In some embodiments, the normalized signatures are created by the analyzer component 110 (e.g., offline with respect to a particular job/query) and the precise signatures are created by the runtime component 120 (e.g., during compilation associated with a particular job/query).

Figure 7:
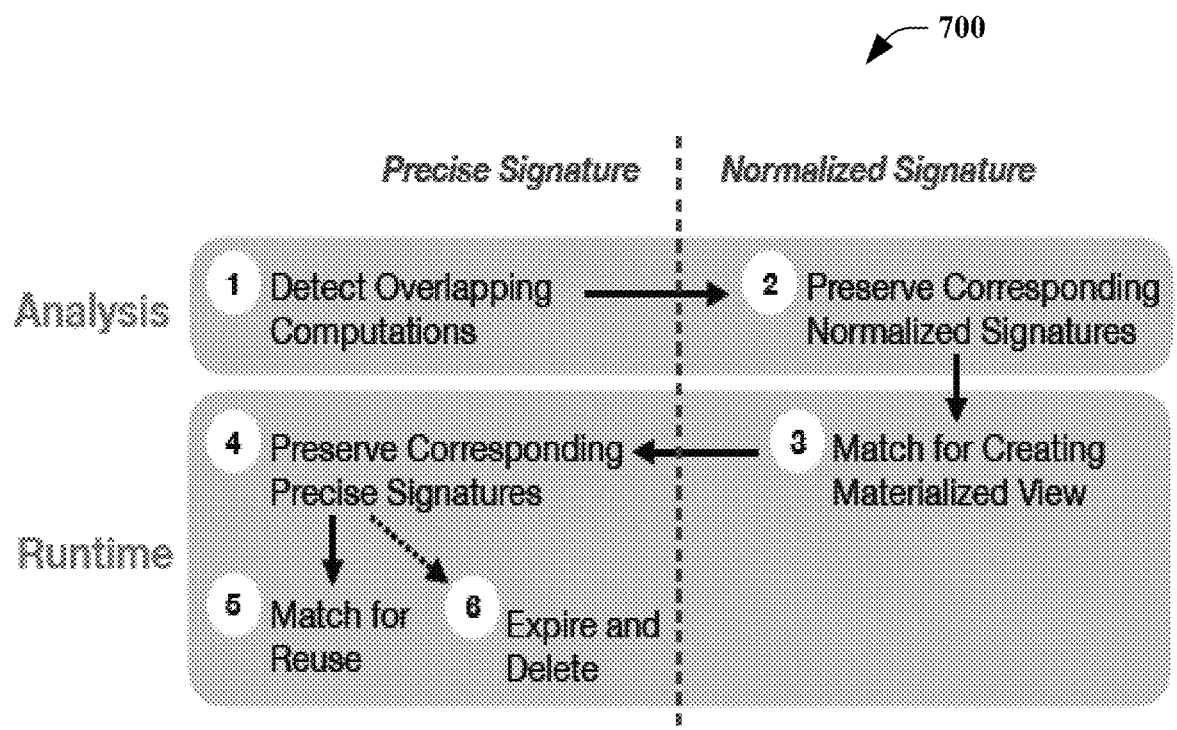
FIG. 7 is a diagram that illustrates the use of a normalized signature and a precise signature.

In some embodiments, the precise signature can be extended to further include the input GUIDs, any user code, and/or any external libraries used for custom code. The normalized signature ensures that the system 100 captures a normalized computation that remains the same across different recurring instances. FIG. 7 is a diagram 700 that illustrates the use of these two signatures in this approach. Any recurring instance from the workload history is analyzed by the analyzer component 110 and frequent computations (views) are selected based on their precise signatures (Step 1). Their corresponding normalized signatures are collected (e.g., stored) into the metadata service component, as discussed below (Step 2). In some embodiments, this analysis needs to be run periodically and/or only when there is a change in the workload, thereby removing the need to run workload analysis within each recurring instance. Later during runtime, subgraphs are materialized based on their normalized signatures (Step 3), but the precise signature of each of the materialized views into the physical path of the materialized files is also recorded (Step 4). The precise signatures are used to match future computations for reuse (Step 5), as well as for expiring a materialized view (Step 6). In summary, the normalized signature identifies subgraphs across recurring instances (for materialization) while the precise signature matches subgraphs within a recurring instance (for reuse). Together, they make computation reuse possible over recurring workloads.

The System Architecture Overview

In some embodiments, the system 100 can include one or more of the following attributes:
(1) Automatic: In some embodiments, it can be difficult for developers to coordinate and reuse overlapping computations amongst themselves. Thus, in some embodiments, overlapping computations can be detected, materialized, reused, and/or evicted automatically by the system 100.
(2) Transparent: In some embodiments, with hundreds of thousands of jobs, it is simply not practical to make changes in user scripts and/or their libraries.
(3) Correct: Computation reuse that does not introduce data corruption. In some embodiments, this can be challenging due to the presence of parameters, users code, and/or external libraries.
(4) Latency-sensitive: Analytics job service users generally cannot afford to slow down their data pipelines. Accordingly, in some embodiments, computation reuse by the system 100 offers better and/or same performance. This requires accurate estimates on the cost/benefit of materialized views. In some embodiments, the optimizer can still discard a view in case it turns out to be too expensive.
(5) Maximize reuse: In some embodiments, the system 100 performs the computation reuse wherever possible. In some embodiments, this can be difficult because overlapping jobs may arrive concurrently and so views materialized in one job may not end up being reused.
(6) Debuggability: Some analytics job services have a rich debuggability experience and computation reuse which the system 100 preserves. Specifically, in some embodiments, customers (and operations team) are able to replay the job, see which materialized views are created or used, trace the jobs which created any of the views, and even drill down into why a view was selected for materialization or reuse in the first place.
(7) Reporting: Finally, in some embodiments, the system 100 can report the impact of computation reuse on job performance, for example, the storage costs and/or runtime savings. In some embodiments, metadata related to the overlapping computations is queryable.

Traditional materialized view technologies typically have three components, an offline view selection component, an offline view building component, and an online view matching component. In some embodiments, the system 100 has two online components: a periodic workload analyzer to mine overlapping computations, and a runtime engine to materialize and reuse those computations.

Figure 8:
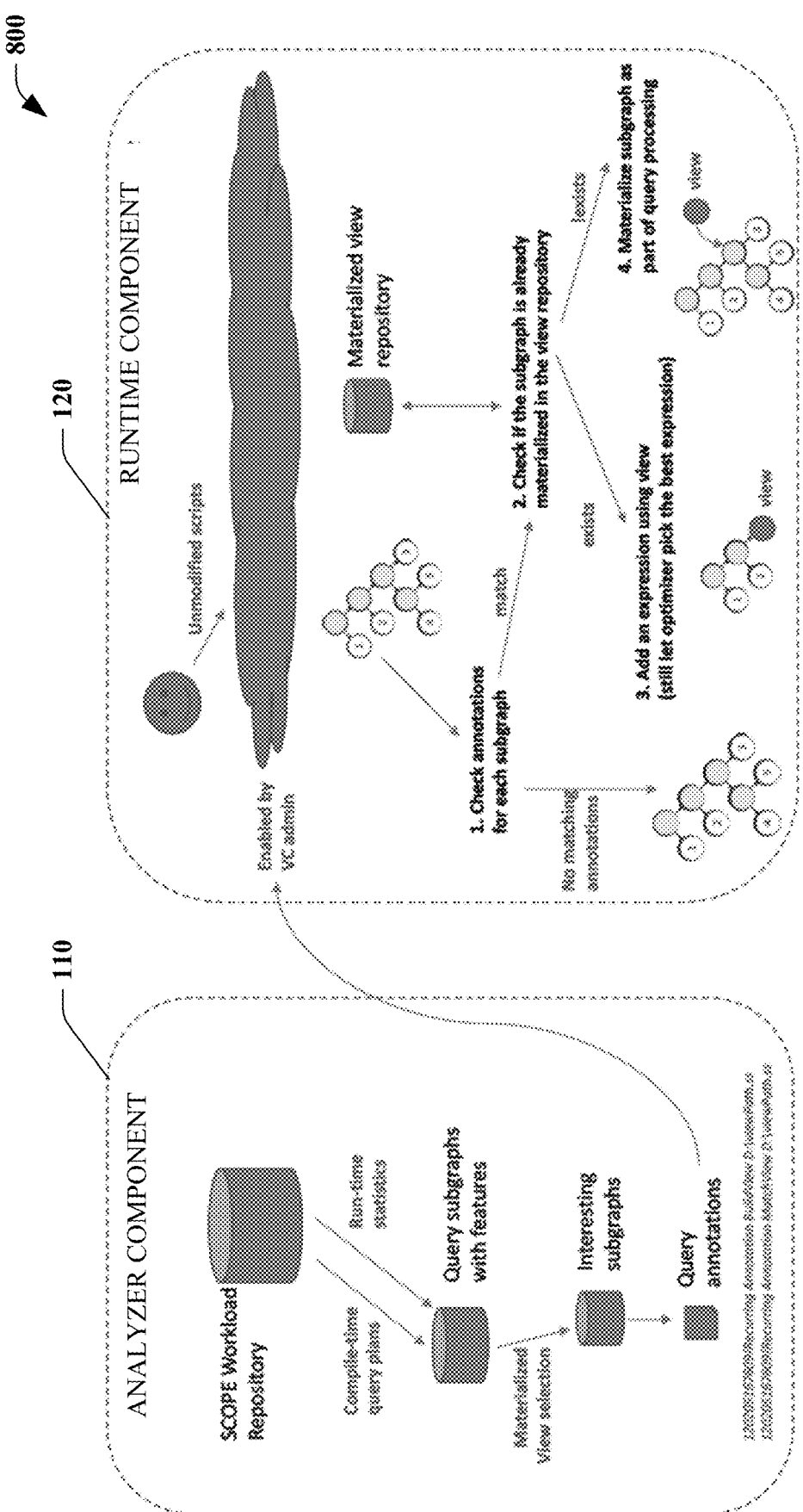
FIG. 8 is a diagram of a high-level architecture.

FIG. 8 illustrates a high-level architecture 800. The left side shows the analyzer component 110 (e.g., periodic workload analyzer) that analyzes the analytics job service workload repository. In some embodiments, administrator(s) can choose to include and/or exclude different VCs for analysis. In some embodiments, the output of this analysis is a set of annotations telling future jobs the subgraph computations to be materialized and reused. The right side of FIG. 8 shows the runtime component 120. Here, in some embodiments, each incoming job can be processed in one of three ways: (i) exactly the same as before in case none of the job subgraphs are materialized or they are deemed to be too expensive by the optimizer, (ii) modified job graph that reads from a materialized view (i.e., there is a matching subgraph annotation and it is materialized) and reading from the materialized view is considered more efficient than re-computing it by the optimizer, and (iii) modified job graph that spools and materializes the output of a subgraph (i.e., there is a matching subgraph annotation but it is not materialized yet). In some embodiments, the analyzer component 110 can be triggered explicitly by the user or scheduled as another recurring job, while the runtime component 120 is triggered by providing a command line flag during job submission. In some embodiments, the job scripts of the end users remain unchanged.

The Analyzer Component

In some embodiments, features of the analyzer component 110 include: (i) providing a feedback loop for runtime statistics, (ii) selecting a physical design for the selected views to materialize, (iii) determining an expiry of a materialized view, and/or (iv) providing a user interface to tune and/or visualize the workload analysis.

The Feedback Loop

Picking the right set of views to materialize can be a difficult problem. Some systems rely on what-if optimization to estimate the expected improvements if the view were to be materialized. Unfortunately, the optimizer cost estimates are often way off due to the presence of complex directed acyclic graphs (DAGs) and/or user code. The problem can become even more severe in a distributed cloud setting where virtual hardware and scheduling issues make it even more difficult to model the actual gains in terms of job latencies. As a result, in some examples, the actual improvements from a materialized view may be much lower while its actual materialization costs may be much higher than the estimated ones. Additionally, materializing a view which later ends up not being used wastes customer money in a job service. In some embodiments, selection of views to materialize is further complicated by dynamic resource allocation within a job graph as well as with bonus resource allocation in the analytics job service.

Figure 9:
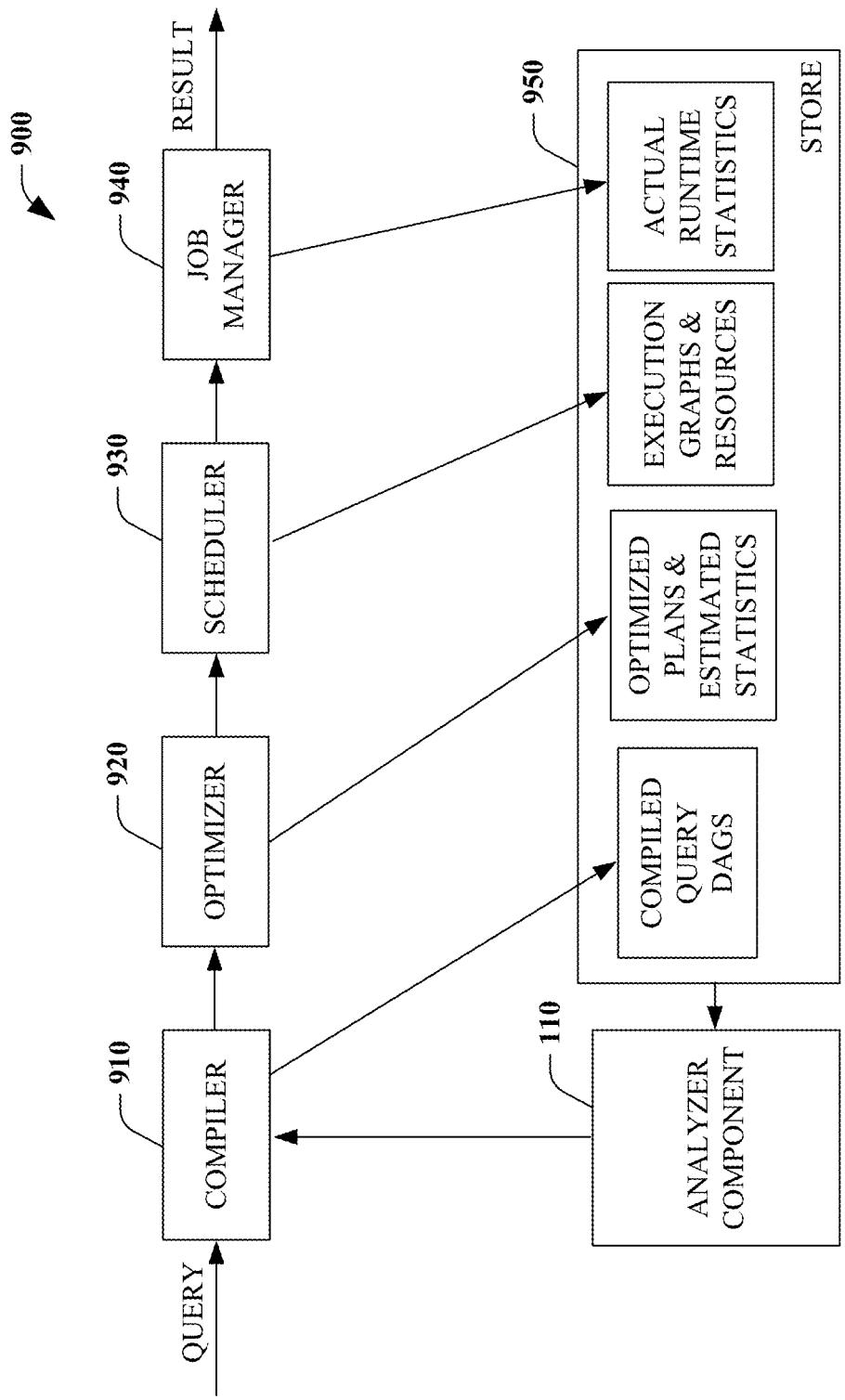
FIG. 9 is a functional block of a system that includes a feedback loop that reconciles compile-time estimates with run-time statistics.

In some embodiments, a system 900 comprises a feedback loop that reconciles compile-time estimates with runtime statistics, as depicted in FIG. 9. In some embodiments, the feedback mechanism provided by the analyzer component 110 goes beyond learning from the same query, and considers arbitrary fine-grained commonalities across multiple jobs. In some embodiments, this is accomplished by enumerating subgraphs (e.g., all possible subgraphs) of job(s) (e.g., all jobs) seen within a time window in the past, e.g., a day or a week, and finding the common subgraphs across them. For example, Queries Q1 and Q2 reading attributes (A, B) and (A, C), respectively, would generate a view (A, B, C) as a candidate, even though it is neither a subgraph of Q1 nor of Q2. Though in some embodiments this is more restricted than considering generalized views, the subgraphs considered have actually been used in the past (e.g., and are likely to be also used in the future) and there are runtime statistics available from those previous runs (allowing for a more accurate prediction of the cost). In order to use the runtime statistics from the previous runs, the job data flow (e.g., one which actually gets executed on a cluster of machines) is connected back to the job query graph (e.g., the tree representation of the input user query). In some embodiments, this is accomplished by linking the operators executed at every stage in the data flow to operators in the query graph. Then, for every query subgraph, corresponding runtime statistics are extracted from the data flow. These include latency (time taken to execute the subgraph), cardinality (number of output rows in the subgraph), data size (in bytes), and/or resource consumption (CPU, memory, parallelism, IO, etc.). In some embodiments, in cases where several operators are pipelined in a data flow, runtime statistics such as resource consumption can be attributed to individual operators, e.g., by subdividing the total resource consumption of pipelined operators based on the exclusive runtime of each operator in the pipeline.

In some embodiments, the feedback loop provided by the analyzer component 110 can have one or more benefits. First, in some embodiments, there can be an inevitable duplication of analysis in user scripts, due to common data preparation needed in multiple analysis and/or simply due to the fact that developers often start from someone else's script before adding their own logic. With the feedback loop in the job service, users do not have to worry about de-duplicating their scripts; the system 100 takes care of doing it automatically at runtime. Second, in some embodiments, the runtime statistics can provide more predictable measures of view materialization costs and benefits, thereby giving the customer a better idea of how much the customer will pay and how much the customer will save with this feature. Third, in some embodiments, the feedback loop makes it more likely that the selected (and materialized) subgraphs will actually end up being used in future jobs, in contrast to picking materialized views based on cost estimates and later finding them not useful if the estimates turn out to be incorrect. Fourth, in some embodiments, the feedback loop considers jobs subgraphs without considering whether to merge two or more subgraphs, as in more a general view selection scenario. This ensures that materializing a view never requires additional computation (and hence additional money) than that would anyways be done by a job using that view. And finally, in some embodiments, the runtime statistics observed from the subgraphs of one job get shared across future queries having any of those subgraphs. In fact, for any new job that comes in, the system may already know the costs of its several subgraphs and may decide to not re-compute them.

Selecting Subgraphs to Materialize

As mentioned above, in some embodiments, the analyzer component 110 can simplify the view selection problem by restricting selection to common subgraphs. Although this is limited when compared with the more generalized view selection, in some embodiments the analyzer component 110 is able to capture precise utility and cost estimates since the subgraphs have been executed in the past. In addition, in some embodiments, during query rewriting the runtime component 120 can simply scan the materialized view, without incurring any other post-processing, and hence the gains can be more predictable.

In some embodiments, the analyzer component 110 utilizes one or more approaches to select the subgraphs to materialize:
  (i) selecting the top k subgraphs using one or more heuristics, e.g., total subgraph utility, total utility normalized by storage cost, and/or limiting to at most one subgraph per-job. In some embodiments, the analyzer component 110 allows users to plug-in custom heuristics to narrow down to the subgraphs of their interest.
  (ii) packing the most interesting subgraphs (or subexpressions) given a set of constraints, e.g., storage constraints, view interaction constraints.

Physical Design

In some embodiments, the analyzer component 110 takes into account the physical design of materialized views. Conventionally, the physical design of materialized views has not been deemed significant as views and their physical design are typically not selected at the same time. However, in some embodiments, it was observed that materialized views with poor physical design end up not being used because the computation savings get over-shadowed by any additional repartitioning and/or sorting that the system needs to do in order to utilize the materialized views. This happens because with massively large datasets and massive parallel processing in analytics job service jobs, repartitioning and/or sorting are often the slowest steps in the job execution.

In some embodiments, the system 100 pays close attention to physical design of view(s). To do so, the analyzer component 110 can extract the output physical properties (e.g., partitioning type, partitioning columns, partitioning number, sort columns, and/or sort direction) of each of the subgraph while enumerating them. In some embodiments, the output physical properties can be good hints for view physical design as they are expected by subsequent operators in the job graph. In case of no explicit physical properties at the subgraph root, the system 100 can infer them from the children, i.e., traverse down until one or more physical properties is encountered. Depending on how an overlapping subgraph is used in different jobs, there may be multiple sets of physical properties for the same subgraph. In some embodiments, the default strategy is to pick the most popular set. However, in some embodiments, in case of no clear choice, multiple physical designs (of the same view) can be treated as different views and fed to the view selection routine.

Expiry and Purging

Although, in some embodiments, storage is inexpensive, the storage space used by materialized views still needs to be reclaimed periodically. In some embodiments, a simple heuristic is to remove all views from the previous recurring instance. However, in some embodiments, output of hourly jobs could also be used in weekly jobs and/or monthly jobs. Therefore, in some embodiments, removing views after each hour/day can be wasteful. In some embodiments, the lineage of the inputs of the view is tracked, i.e., for each of the view input, check the longest duration that it gets used by any of the recurring jobs. In some embodiments, the maximum of all such durations gives a good estimate of the view expiry. Apart from using standard analytics job service scripts, this type of lineage tracking could also be facilitated using provenance tools. The view expiry thus obtained can be encoded into the physical files, and the Storage Manager can take care of purging the file once it expires.

In some embodiments, cluster administrator(s) can also reclaim a given storage space by running the same view selection routines as described above, but replacing the max objective function with a min, i.e., picking the views with minimum utility. In the worst case, the materialized view files can be simply erased from the cluster. In some embodiments, both of the above operators, however, require cleaning the views from the metadata service (discussed below) first before deleting any of the physical files (to ensure that jobs consuming any of those inputs do not fail).

User Interfaces

In some embodiments, the system 100 provides one or more ways to interact with the analyzer component 110. First, a command line interface to run the analyzer component 110 over user specific clusters, VCs, and/or time ranges can be provided. In some embodiments, users can also provide their custom constraints, e.g., storage costs, latency, CPU hours, and/or frequency, to filter down the overlapping computations. In some embodiments, the system 100 provides a power business intelligence dashboard for a user to review various summary(ies) from computation overlap analysis, as well as to drill down into the topmost (e.g., 100) overlapping computations in more detail. Together, the goal is to help users understand the computation overlap in their workloads and to tailor computation reuse for their needs.

The Runtime Component

Figure 10:
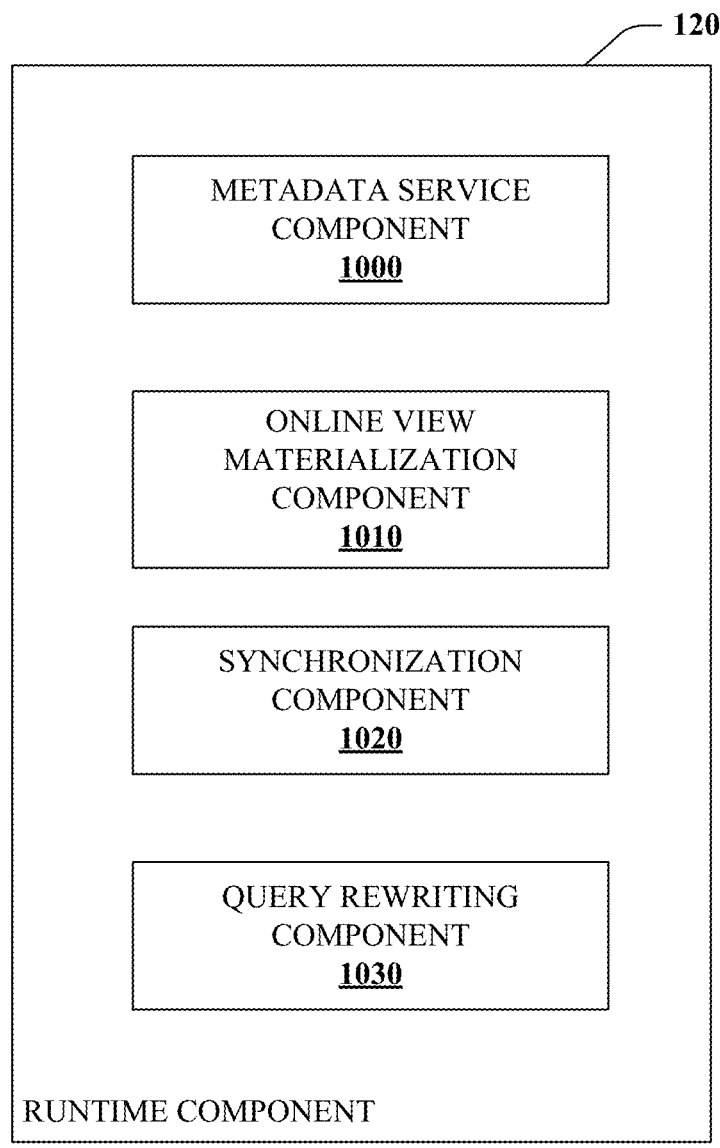
FIG. 10 is a functional block diagram of a runtime component.

The runtime component 120 facilitates computation reuse during online query processing. Referring to FIG. 10 with continued reference to FIG. 9, in some embodiments, the runtime component 120 includes one or more of (i) a metadata service component 1000 to query the relevant overlaps in each incoming job, (ii) an online view materialization component 1010 to materialize views as part of query processing, (iii) a synchronization component 1020 to prevent concurrent jobs from materializing the same view, (iv) early materialization to publish a materialized view even before the job producing it completes, (v) an automatic query rewriting component 1030 to use materialized views wherever possible, and/or (vi) hints provided a job scheduler 930 in order to maximize the computation reuse.

Metadata Service Component

Figure 11:
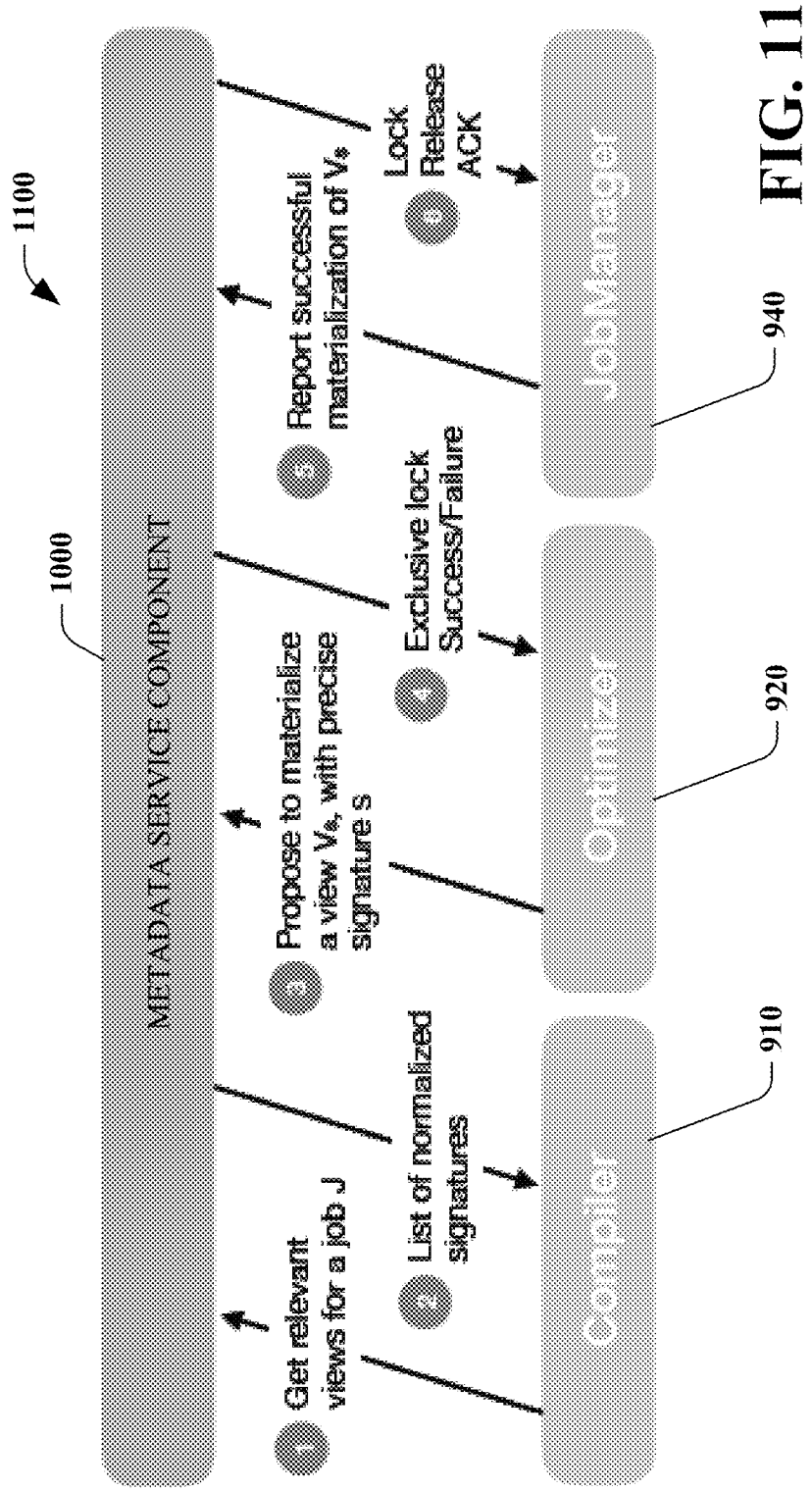
FIG. 11 is a diagram that illustrates interaction of various components with a metadata service component at runtime.

In some embodiments, the metadata service component 1000 provides a information regarding overlapping computations and coordinates the materialization and reuse of those computations. In an online setting, i.e., data batches and jobs arrive continuously, view materialization and reuse is a dynamic activity. Therefore, instead of simply looking up the views in the compiler 1010, multiple analytics job service components interact with the metadata service component 1000 at runtime. FIG. 11 is a diagram 1100 that illustrates interaction of various components with the metadata service component 1100 at runtime. First, the compiler 910 asks the metadata service component 1100 for overlapping computations (views) for a given job J (Step 1). In some embodiments, a naive approach is for the compiler 910 to lookup each subgraph individually to check whether or not this is an overlapping computation. However, the number of lookup requests can grow prohibitively large since analytics job service job graphs can be quite large, thereby leading to higher compilation overhead as well as higher throughput requirements from the metadata service component 1100. In some embodiments, instead, one request per-job is made and all overlaps that could be relevant for that job are fetched. In some embodiments, this can be done by creating an inverted index as follows. For each overlapping computation instance, tags are extracted from its corresponding job metadata. The tags are for recurring jobs are normalized and an inverted index on the tags created to point to the corresponding normalized signatures. The metadata service component 1000 returns the list of normalized signatures relevant to J to the compiler 910 (Step 2). In some embodiments, the signatures returned by the metadata service component 1000 may contain false positives, and the optimizer 920 can still need to match them with the actual signatures in the query tree.

Second, when the optimizer 920 tries to materialize an overlapping computation, it proposes the materialization to the metadata service component 1000 (Step 3). The metadata service component 1000 tries to create an exclusive lock to materialize this view. Due to the large number of concurrently running jobs, the same view could be already materialized by another job, i.e., the lock already exists. In this case, the service returns a failure message, otherwise, it returns success (Step 4). Note that, in some embodiments, the average runtime of the view subgraph from the past occurrences is mined, and used to set the expiry of the exclusive lock. Once the exclusive lock expires, and if the view is still not materialized, another job could try to create the same materialized view. This gives the system 100, 900 a fault-tolerant behavior for view materialization.

Finally, a job manager 1110 reports the successful materialization of a view to the metadata service component 1100 (Step 5) and the metadata service component 1000 acknowledges the lock release (Step 6). The metadata service component 1000 now makes the materialized view available for other jobs to reuse, i.e., it may appear the next time the compiler 910 asks for relevant views for a job (Step1). In some embodiments, the metadata service component 1000 periodically polls for the output of the analyzer component 110 and loads the set of selected overlapping computations whenever new analysis is available. In some embodiments, computations can be expired at regular intervals.

The system 900 further includes a scheduler 930 that stores execution graphs and resources for queries in a store 950, and, a job manager 940 that stores actual runtime statistics for queries in the store 950 and provides result(s) to the query. In some embodiments, the compiler 910 stores compiled query DAGs in the store 950. In some embodiments, the optimizer 920 stores optimization plans and estimated statistics in the store 950. In some embodiments, the analyzer component 110 can utilize at least some of the information stored in the store 950 when performing its analysis, as discussed above.

Online Materialization

Traditional materialized views generally require an offline process where, for example, the database administrator is responsible to first create all relevant materialized views, i.e., the preprocessing step, before the database becomes available for running the query workload. This is not practical with recurring jobs which run in tight data pipelines with strict completion deadlines, where there is little room to do the preprocessing for creating the materialized views. Preprocessing can block the recurring jobs, thereby causing them to miss their completion deadlines. Recurring jobs also have data dependency between them, i.e., result of one recurring job is used in subsequent recurring jobs. Thus, missing completion deadline for one recurring job can affect the entire data pipeline.

Figure 12:
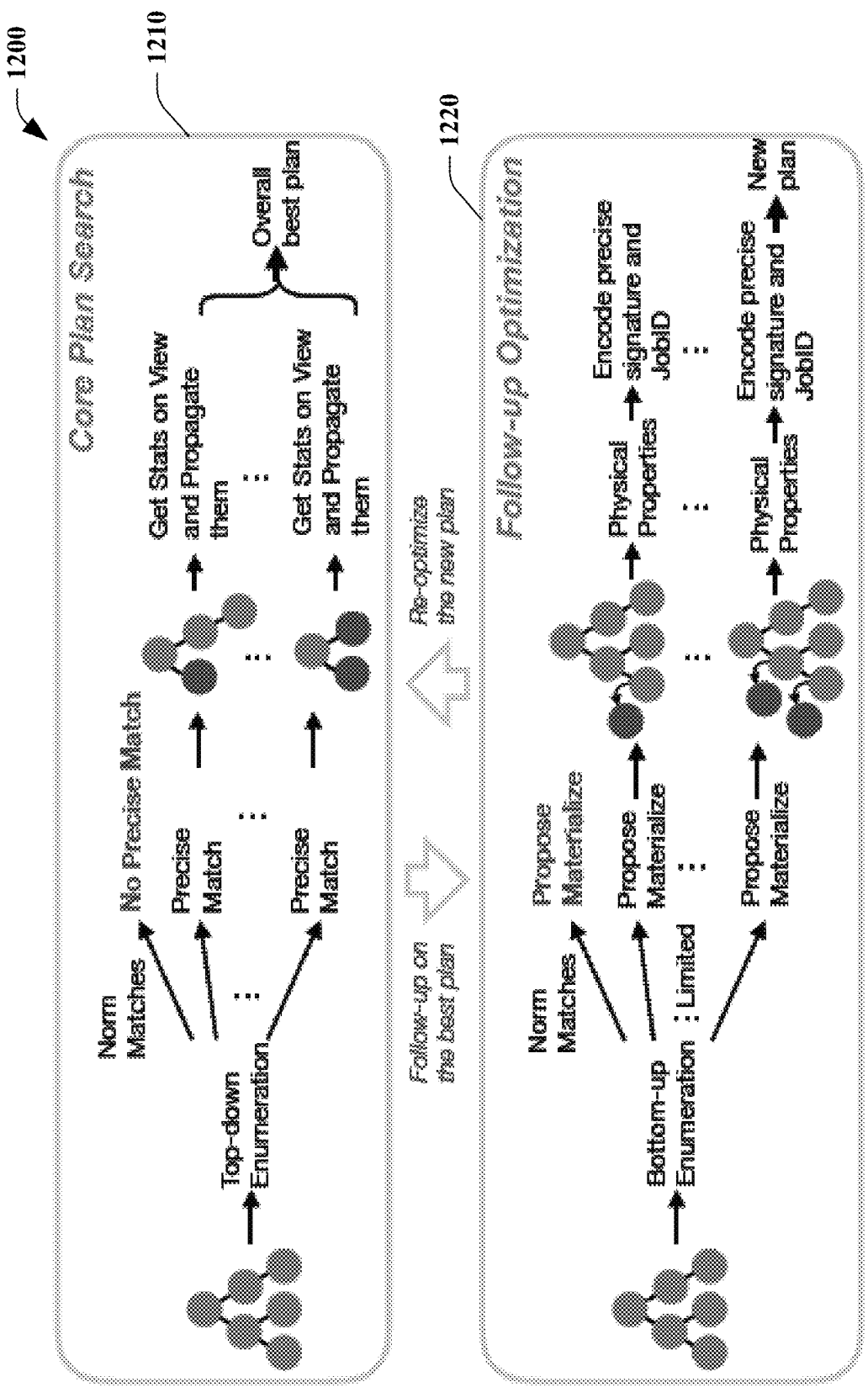
FIG. 12 is a diagram that illustrates a mechanism to create and reuse materialized views as part of query processing.

In some embodiments, the online view materialization component 1010 of the runtime component 120 provides a mechanism to create and reuse materialized views as part of the query processing, as depicted in FIG. 12. FIG. 12 is a diagram 1200 that illustrates a core plan search 1210 and a follow-up optimization 1220. After fetching the relevant normalized signatures from the metadata service component 1000, the compiler 910 supplies them as annotations to the query optimizer 920. In some embodiments, the compiler 910 also preserves the annotations as a job resource for future reproducibility. In some embodiments, the optimizer 920 first checks for all reuse opportunities in the plan search phase before trying to materialize one or more views in a follow-up optimization phase as illustrated in follow-up optimization 1220. This ensures that views already materialized (and available) are not attempted for materialization. During follow-up optimization 1220, the optimizer 920 checks whether the normalized signature of any of the subgraphs matches with the ones in the annotation. In some embodiments, the normalized signatures are matched in a bottom-up fashion (materializing smaller views first as they typically have more overlaps) and limit the number of views that could be materialized in a job (could be changed by the user via a job submission parameter). In case of a match, the optimizer 920 proposes to materialize the view (Step 3 in FIG. 11). On receiving success from the metadata service component 1000, the optimizer 920 adjusts the query plan to output a copy of the sub-computation to a materialized view, while keeping the remainder of the query plan unmodified as before. The new output operator also enforces the physical design mined by the analyzer for this view. In some embodiments, the optimizer 920 takes care of adding any extra partitioning/sorting operators to meet those physical property requirements. In some embodiments, the optimizer 920 stores the precise signature of each materialized view as well as the identifier of the job producing the materialized view (for tracking the view provenance) into the physical path of the materialized file.

In some embodiments, the online view materialization component 1010 can perform the following features. First, in some embodiments, the online view materialization component 1010 includes a mechanism to create materialized views with minimal overhead is introduced as part of the query processing, without requiring any up-front preprocessing that would block the recurring queries. Second, the first query that hits a view to materialize causes it to be materialized and subsequent queries to reuse it wherever possible. As a result, the online view materialization component 1010 materializes views, and hence consumes storage, just when they are to be needed, instead of creating them a priori, for example, long before they would ever be used. Third, the online view materialization component 1010 does not need to coordinate between the query which materializes the view (as part of its execution), and the queries which reuse that materialized view; in case of multiple queries arriving at the same time, the one which finishes first materializes the view. Fourth, in case there is a change in query workload starting from a given recurring instance, then the view materialization based on the previous workload analysis stops automatically as the signatures do not match anymore. This avoids paying for and consuming resources for redundant views that are not going to be used after all. In some embodiments, this can also be an indication that it is time to rerun the workload analysis. Finally, in some embodiments, the online view materialization component 1010 does not affect any of the user infrastructure in their analytics stack. This means that the user scripts, data pipelines, query submission, and/or job scheduling, can remain intact as before.

In some embodiments, for traditional users with enough room for upfront view materialization, e.g., weekly analytics, the system 100 can still provide an offline view materialization mode. In this mode, the optimizer 920 extracts the matching overlapping computation subgraph while excluding any remaining operation in the job. The resulting plan materializes only the views and can be executed offline, i.e., before running the actual workload. The offline mode can be configured at the VC level in the metadata service component 1000, and later the annotations passed to the optimizer 920 are marked either online or offline depending on the metadata service component 1000 configuration.

Query Rewriting 1030

In some embodiments, to rewrite queries using materialized views a query rewriting component 1030 comprises an additional task in the Volcano style plan search. This additional task, as shown in the core plan search 1210 of FIG. 12, matches the normalized signatures retrieved from the metadata service with the normalized signatures of each of the query subgraphs in a top-down fashion, for example, the largest materialized views are matched first. In case of a match, the optimizer 920 matches the precise signature as well. In some embodiments, only if the precise signature matches then the materialized view can be reused. In such a scenario, the optimizer 920 adds an alternate subexpression plan which reads from the materialized view. In some embodiments, the number of materialized views that could be used to answer a query is not limited. Once all applicable materialized views have been added as alternate subexpressions, the optimizer 920 picks the best plan based on the cost estimates, i.e., one or more materialized views may end being not used if their read costs are too high. The plan that reads from the materialized view also loads the actual statistics (for that sub-computation) as well as propagates those statistics up the query tree. This gives more confidence in deciding whether the plan using the materialized view is actually a good one or not. Overall, in some embodiments, fully automatic query rewriting using views is provided, with zero changes to user scripts.

Synchronization 1020

In some embodiments, the runtime component 120 includes synchronization feature(s) including: (i) build-build synchronization, i.e., not having multiple jobs materialize the same view, and/or (ii) build-use synchronization, i.e., re-use a computation as soon as it is materialized. In some embodiments, the build-build synchronization is handled by trying to reuse computations before trying to materialize them, as described above. For concurrent jobs, exclusive locks can be created via the metadata service component 1000, as described above. In some embodiments, the metadata service component 1000 is backed by Azure SQL® which provides consistent locking, and only a single job can actually materialize a view at a time. To handle the build-use synchronization, in some embodiments, the analytics job service job manager 940 is modified to publish the materialized view as soon as it is available. This means that the materialized view output is available even before the job that produces it finishes. This is referred to as early materialization. Early materialization is a semantic change as it breaks the atomicity of analytics job service jobs, however, it very useful because the views can be a much smaller subgraph of the overall job graph. Furthermore, the materialized view is not a user output, but is rather treated as a system output, and therefore does not affect the user contract. Finally, in some embodiments, early materialization also helps in case of jobs failures, since the job can restart from the materialized view now, i.e., early materialization acts as a checkpoint.

Job Coordination

The perfect scenario for computation reuse is when one of the jobs with overlapping computation is scheduled before others, so that the view can be computed exactly once and reused by others. However, in some embodiments, multiple jobs containing the same overlapping computation can be scheduled concurrently. In this case, they will re-compute the same subgraph and even attempt to materialize it (though only one will prevail). In some embodiments, this can be mitigated by reordering recurring jobs in the client job submission systems. To do this, in addition to selecting the interesting computations to materialize, in some embodiments, the analyzer component 110 also provides the submission order of the recurring jobs that contain those computations, which will give the maximum benefit. This can be performed by grouping jobs having the same overlaps (job with multiple overlaps can appear in multiple groups) and picking the smallest job in terms of runtime, or least overlapping job in case of a tie, from each group. The de-duplicated list of above jobs will create the materialized views that can be used by others, and so they are run first (e.g., ordered by their runtime and breaking ties using the number of overlaps). Such an ordering can be enforced using the analytics job service client-side job submission tools.

FIGS. 13-16 illustrate exemplary methodologies relating to detecting and reusing overlapping computations in an analytics job service. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 13:
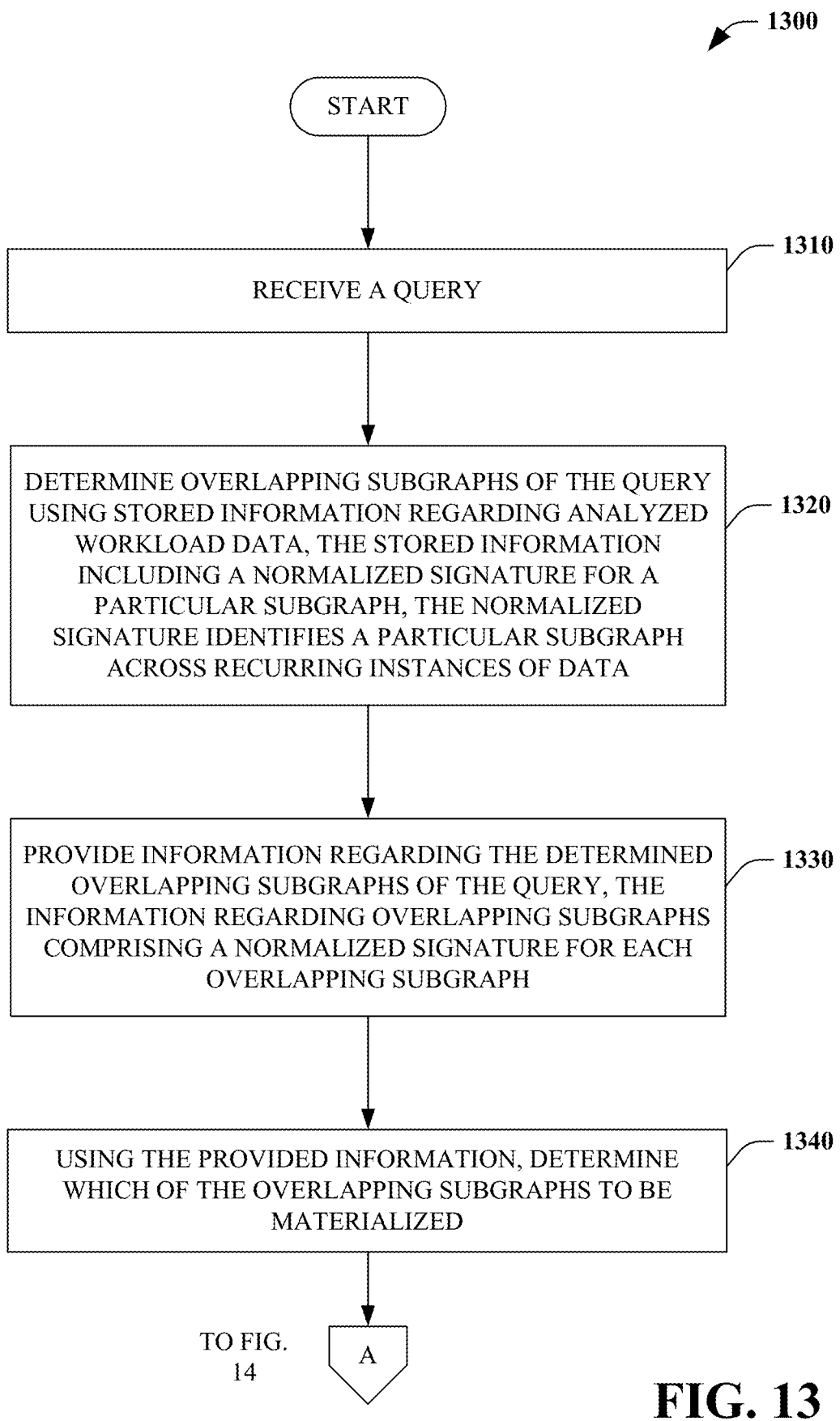
FIG. 13 is a flow chart of a method of reusing overlapping computations in an analytics job service.
Figure 14:
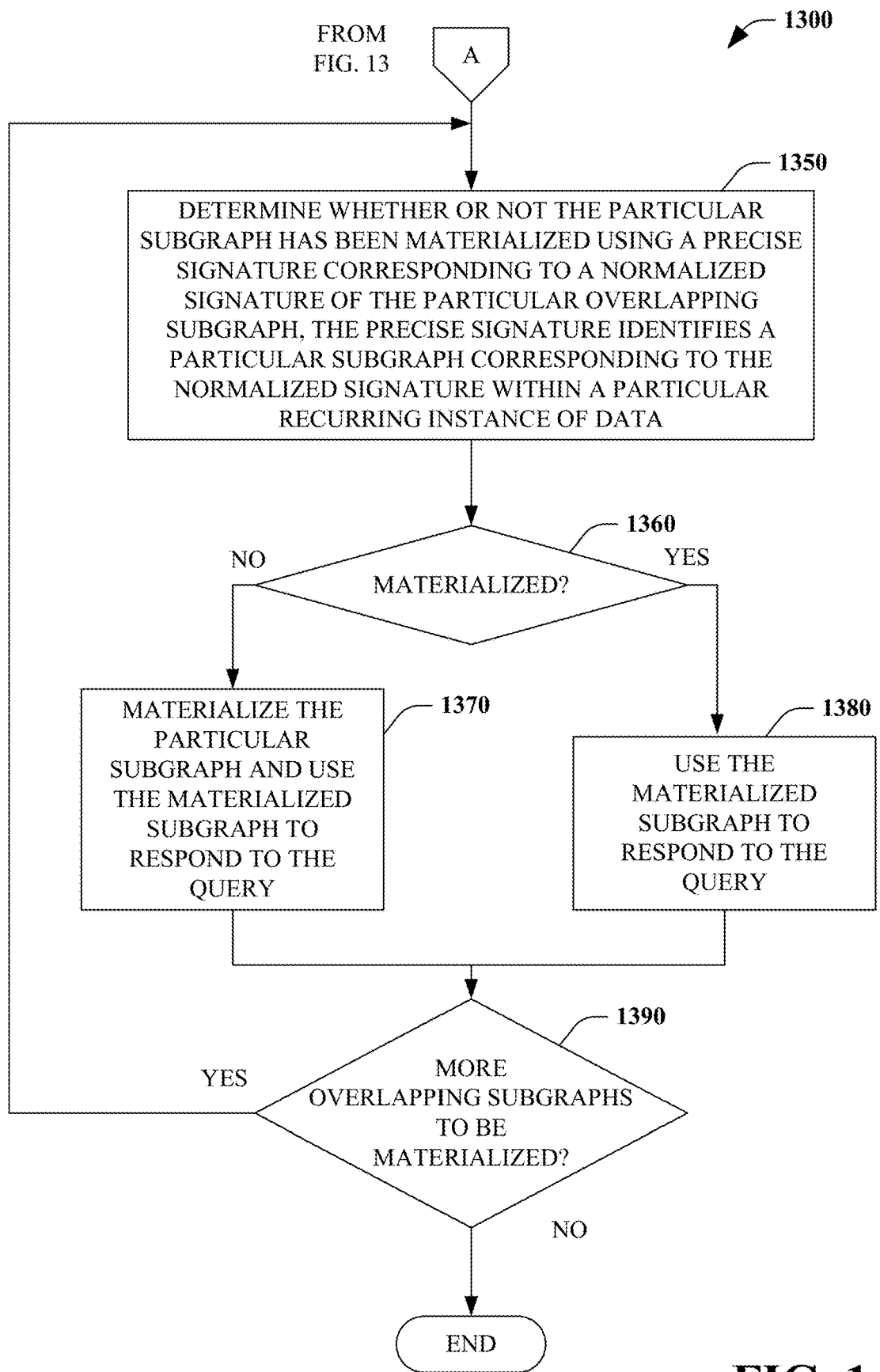
FIG. 14 is a flow chart further illustrating the method of FIG. 13.

Referring to FIGS. 13 and 14, a method of reusing overlapping computations in an analytics job service 1300 is illustrated. In some embodiments, the method 1300 is performed by the system 100 and/or the system 900.

At 1310, a query is received. At 1320, overlapping subgraphs of the query are determined using stored information regarding analyzed workload data. The stored information includes a normalized signature for a particular subgraph. The normalized signature identifies a particular subgraph across recurring instances of data.

At 1330, information regarding the determined overlapping subgraphs of the query is provided. The information regarding overlapping subgraphs comprises a normalized signature for each overlapping subgraph. At 1340, which of the overlapping subgraphs to be materialized is determined.

At 1350, it is determined whether or not the particular subgraph has been materialized using a precise signature corresponding to a normalized signature of the particular overlapping subgraph. The precise signature identifies a particular subgraph corresponding to the normalized signature within a particular recurring instance of data. At 1360, a determination is made as to whether or not the particular subgraph has been materialized. If the determination at 1360 is NO, at 1370 the particular subgraph is materialized and used to respond to the query, and, processing continues at 1390. If the determination at 1360 is YES, at 1380, the materialized particular subgraph is used to respond to the query.

At 1390, a determination is made as to whether or not there are more overlapping subgraphs to be materialized. If the determination at 1390 is NO, no further processing occurs. If the determination at 1390 is YES, processing continues at 1350.

Figure 15:
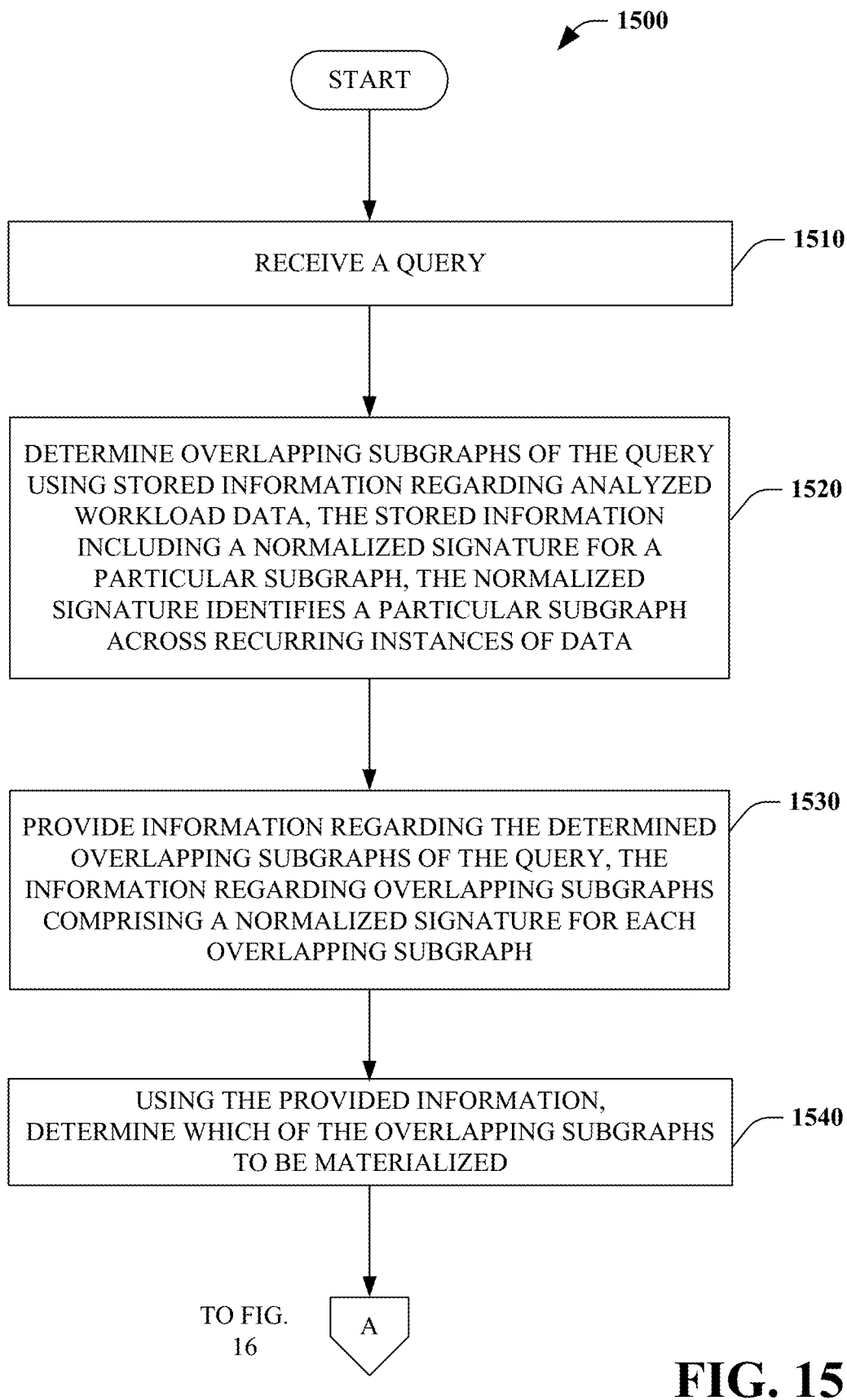
FIG. 15 is a flow chart of a method of reusing overlapping computations in an analytics job service.
Figure 16:
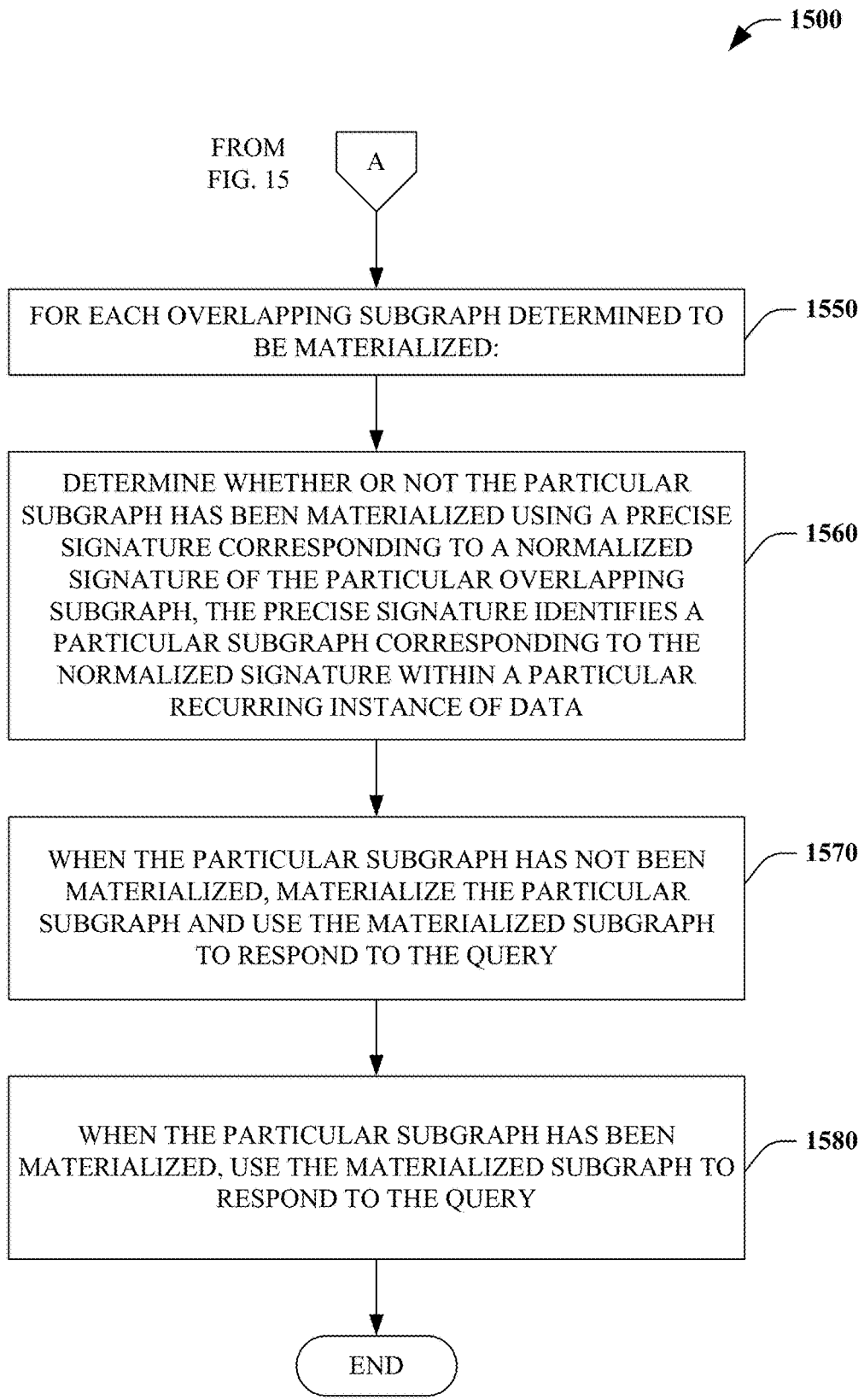
FIG. 16 is a flow chart further illustrating the method of FIG. 14.

Referring to FIGS. 15 and 16, a method of reusing overlapping computations in an analytics job service 1500 is illustrated. In some embodiments, the method 1500 is performed by the system 100 and/or the system 900.

At 1510, a query is received. At 1520, overlapping subgraphs of the query are determined using stored information regarding analyzed workload data. The stored information includes a normalized signature for a particular subgraph. The normalized signature identifies a particular subgraph across recurring instances of data.

At 1530, information regarding the determined overlapping subgraphs of the query is provided. The information regarding overlapping subgraphs comprises a normalized signature for each overlapping subgraph. At 1540, which of the overlapping subgraphs to be materialized is determined.

At 1550, for each overlapping subgraph determined to be materialized: at 1560, determine whether or not the particular subgraph has been materialized using a precise signature corresponding to a normalized signature of the particular overlapping subgraph, the precise signature identifies a particular subgraph corresponding to the normalized signature within a particular recurring instance of data; at 1570, when the particular subgraph has not been materialized, materialize the subgraph and use the materialized subgraph to respond to the query; and, at 1580, when the particular subgraph has been materialized, use the materialized subgraph to respond to the query.

Described herein is a system for reusing overlapping computations in an analytics job service, comprising: a computer comprising a processor and a memory having computer-executable instructions stored thereupon which, when executed by the processor, cause the computer to: receive a query; determine overlapping subgraphs of the query using stored information regarding analyzed workload data, the stored information including a normalized signature for a particular subgraph, the normalized signature identifies a particular subgraph across recurring instances of data; provide information regarding the determined overlapping subgraphs of the query, the information regarding overlapping subgraphs comprising a normalized signature for each overlapping subgraph; using the provided information, determine which of the overlapping subgraphs is to be materialized; for each overlapping subgraph determined to be materialized: determine whether or not the particular subgraph has been materialized using a precise signature corresponding to a normalized signature of the particular overlapping subgraph, the precise signature identifies a particular subgraph corresponding to the normalized signature within a particular recurring instance of data; when the particular subgraph has not been materialized, materialize the subgraph and use the materialized subgraph to respond to the query; and when the particular subgraph has been materialized, use the materialized subgraph to respond to the query.

The system can further include wherein analysis of workload data is performed prior to receiving the query. The system can include wherein the normalized signature is independent of a particular instance of data. The system can further include wherein the stored information regarding analyzed workload data further comprises at least one of compiled query subgraphs, optimized plans and estimated statistics, execution graphs and resources, or actual runtime statistics of executed queries. The system can include wherein the stored information regarding analyzed workload data further comprises information regarding a physical design for at least one subgraph to be materialized.

The system can further include wherein the stored information regarding analyzed workload data further comprises information regarding expiry of a materialized subgraph. The system can include wherein the stored information regarding analyzed workload data is based, at least in part, upon a user selectable setting regarding at least one of storage costs, latency, CPU hours, or frequency. The system can further include wherein the stored information regarding analyzed workload data is based upon analysis of runtime statistics of subgraphs of a plurality of jobs including at least one of latency, cardinality, data size, or resource consumption of subgraphs.

Described herein is a method of automatically reusing overlapping computations in an analytics job service, comprising: receiving a query; determining overlapping subgraphs of the query using stored information regarding analyzed workload data, the stored information including a normalized signature for a particular subgraph, the normalized signature identifies a particular subgraph across recurring instances of data; providing information regarding the determined overlapping subgraphs of the query, the information regarding overlapping subgraphs comprising a normalized signature for each overlapping subgraph; using the provided information, determining which of the overlapping subgraphs is to be materialized; for each overlapping subgraph determined to be materialized: determining whether or not the particular subgraph has been materialized using a precise signature corresponding to a normalized signature of the particular overlapping subgraph, the precise signature identifies a particular subgraph corresponding to the normalized signature within a particular recurring instance of data; when the particular subgraph has not been materialized, materializing the subgraph and use the materialized subgraph to respond to the query; and when the particular subgraph has been materialized, using the materialized subgraph to respond to the query.

The method can further include wherein analysis of workload data is performed prior to receiving the query. The method can include wherein the normalized signature is independent of a particular instance of data. The method can further include wherein the stored information regarding analyzed workload data further comprises at least one of compiled query subgraphs, optimized plans and estimated statistics, execution graphs and resources, or actual runtime statistics of executed queries.

The method can further include herein the stored information regarding analyzed workload data further comprises information regarding a physical design for at least one subgraph to be materialized. The method can include wherein the stored information regarding analyzed workload data further comprises information regarding expiry of a materialized subgraph.

The method can further include wherein the stored information regarding analyzed workload data is based, at least in part, upon a user selectable setting regarding at least one of storage costs, latency, CPU hours, or frequency. The method can include wherein the stored information regarding analyzed workload data is based upon analysis of runtime statistics of subgraphs of a plurality of jobs including at least one of latency, cardinality, data size, or resource consumption of subgraphs.

Described herein is a computer storage media storing computer-readable instructions that when executed cause a computing device to: determine overlapping subgraphs of the query using stored information regarding analyzed workload data, the stored information including a normalized signature for a particular subgraph, the normalized signature identifies a particular subgraph across recurring instances of data; provide information regarding the determined overlapping subgraphs of the query, the information regarding overlapping subgraphs comprising a normalized signature for each overlapping subgraph; using the provided information, determine which of the overlapping subgraphs is to be materialized; for each overlapping subgraph determined to be materialized: determine whether or not the particular subgraph has been materialized using a precise signature corresponding to a normalized signature of the particular overlapping subgraph, the precise signature identifies a particular subgraph corresponding to the normalized signature within a particular recurring instance of data; when the particular subgraph has not been materialized, materialize the subgraph and use the materialized subgraph to respond to the query; and when the particular subgraph has been materialized, use the materialized subgraph to respond to the query.

The computer storage media can further include wherein the stored information regarding analyzed workload data further comprises at least one of compiled query subgraphs, optimized plans and estimated statistics, execution graphs and resources, or actual runtime statistics of executed queries. The computer storage media can include wherein the stored information regarding analyzed workload data further comprises information regarding a physical design for at least one subgraph to be materialized. The computer storage media can further include wherein the stored information regarding analyzed workload data further comprises information regarding expiry of a materialized subgraph.

Figure 17:
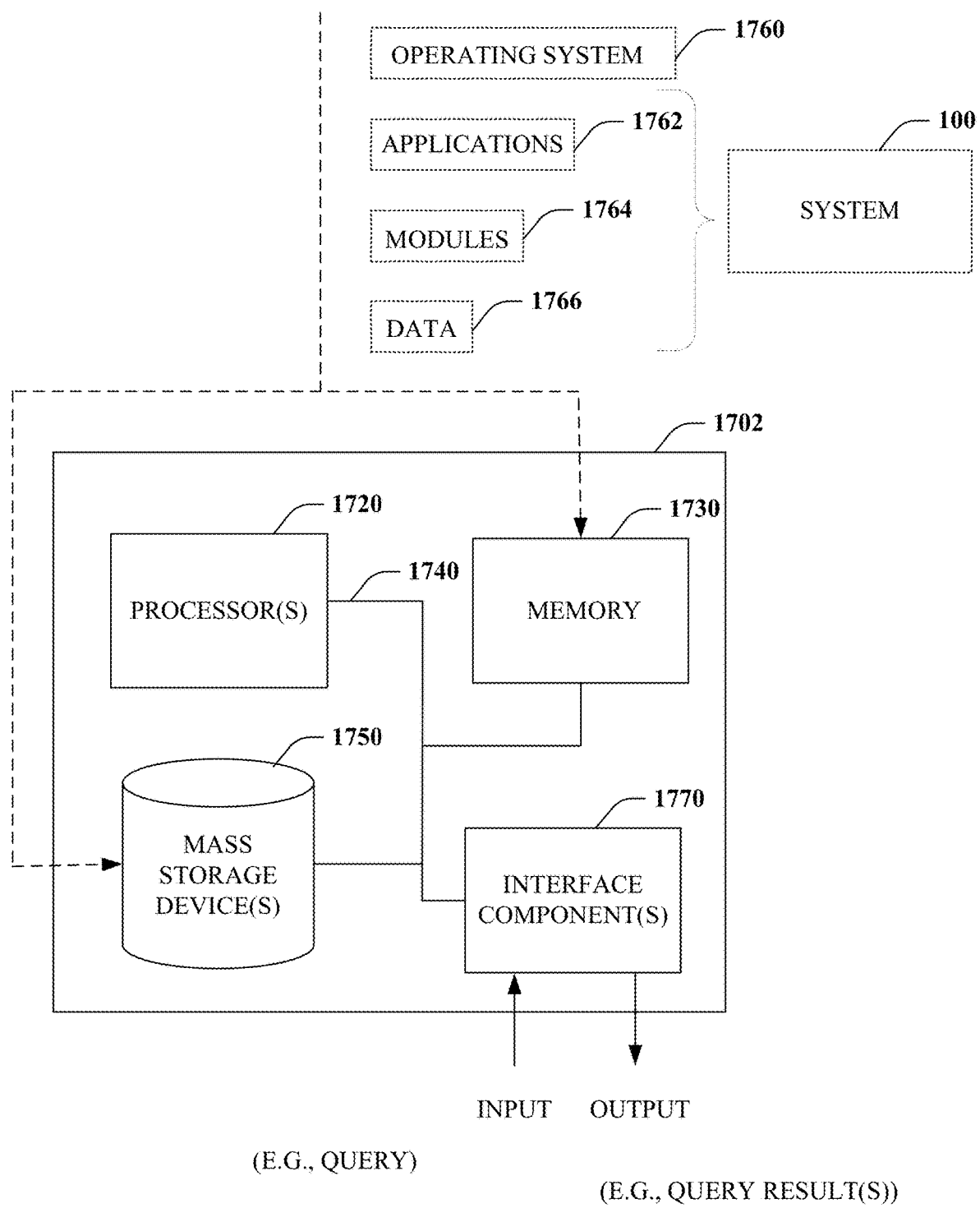
FIG. 17 is a functional block diagram that illustrates an exemplary computing system.

With reference to FIG. 17, illustrated is an example general-purpose computer or computing device 1702 (e.g., mobile phone, desktop, laptop, tablet, watch, server, handheld, programmable consumer or industrial electronics, settop box, game system, compute node). For instance, the computing device 1702 may be used in a system for automatically detecting and reusing overlapping computations in an analytics job service 100.

The computer 1702 includes one or more processor(s) 1720, memory 1730, system bus 1740, mass storage device(s) 1750, and one or more interface components 1770. The system bus 1740 communicatively couples at least the above system constituents. However, it is to be appreciated that in its simplest form the computer 1702 can include one or more processors 1720 coupled to memory 1730 that execute various computer executable actions, instructions, and or components stored in memory 1730. The instructions may be, for instance, instructions for implementing functionality described as being carried out by one or more components discussed above or instructions for implementing one or more of the methods described above.

The processor(s) 1720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1720 can be a graphics processor.

The computer 1702 can include or otherwise interact with a variety of computer-readable media to facilitate control of the computer 1702 to implement one or more aspects of the claimed subject matter. The computer-readable media can be any available media that can be accessed by the computer 1702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other like mediums that store, as opposed to transmit or communicate, the desired information accessible by the computer 1702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1730 and mass storage device(s) 1750 are examples of computer-readable storage media. Depending on the exact configuration and type of computing device, memory 1730 may be volatile (e.g., RAM), non-volatile (e.g., ROM, flash memory) or some combination of the two. By way of example, the basic input/output system (BIOS), including basic routines to transfer information between elements within the computer 1702, such as during start-up, can be stored in nonvolatile memory, while volatile memory can act as external cache memory to facilitate processing by the processor(s) 1720, among other things.

Mass storage device(s) 1750 includes removable/non-removable, volatile/non-volatile computer storage media for storage of large amounts of data relative to the memory 1730. For example, mass storage device(s) 1750 includes, but is not limited to, one or more devices such as a magnetic or optical disk drive, floppy disk drive, flash memory, solid-state drive, or memory stick.

Memory 1730 and mass storage device(s) 1750 can include, or have stored therein, operating system 1760, one or more applications 1762, one or more program modules 1764, and data 1766. The operating system 1760 acts to control and allocate resources of the computer 1702. Applications 1762 include one or both of system and application software and can exploit management of resources by the operating system 1760 through program modules 1764 and data 1766 stored in memory 1730 and/or mass storage device (s) 1750 to perform one or more actions. Accordingly, applications 1762 can turn a general-purpose computer 1702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1762, and include one or more modules 1764 and data 1766 stored in memory and/or mass storage device(s) 1750 whose functionality can be realized when executed by one or more processor(s) 1720.

In accordance with one particular embodiment, the processor(s) 1720 can correspond to a system on a chip (SOC) or like architecture including, or in other words integrating, both hardware and software on a single integrated circuit substrate. Here, the processor(s) 1720 can include one or more processors as well as memory at least similar to processor(s) 1720 and memory 1730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1702 also includes one or more interface components 1770 that are communicatively coupled to the system bus 1740 and facilitate interaction with the computer 1702. By way of example, the interface component 1770 can be a port (e.g., serial, parallel, PCMCIA, USB, FireWire) or an interface card (e.g., sound, video) or the like. In one example implementation, the interface component 1770 can be embodied as a user input/output interface to enable a user to enter commands and information into the computer 1702, for instance by way of one or more gestures or voice input, through one or more input devices (e.g., pointing device such as a mouse, trackball, stylus, touch pad, keyboard, microphone, joystick, game pad, satellite dish, scanner, camera, other computer). In another example implementation, the interface component 1770 can be embodied as an output peripheral interface to supply output to displays (e.g., LCD, LED, plasma), speakers, printers, and/or other computers, among other things. Still further yet, the interface component 1770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for reusing overlapping computations in an analytics job service, the system comprising:
    a computer comprising a processor and a memory having computer-executable instructions stored thereupon which, when executed by the processor, cause the computer to:
    receive a query;
    determine overlapping subgraphs of the query using stored information regarding analyzed workload data, the stored information including a normalized signature for a particular subgraph, the normalized signature identifies a particular subgraph across recurring instances of data;
    provide information regarding the determined overlapping subgraphs of the query, the information regarding overlapping subgraphs comprising a normalized signature for each overlapping subgraph;
    using the provided information, determine which of the overlapping subgraphs is to be materialized;
    for each overlapping subgraph determined to be materialized:
        determine whether or not the particular subgraph has been materialized using a precise signature corresponding to a normalized signature of the particular overlapping subgraph, the precise signature identifies a particular subgraph corresponding to the normalized signature within a particular recurring instance of data;
        when the particular subgraph has not been materialized, materialize the subgraph and use the materialized subgraph to respond to the query; and
        when the particular subgraph has been materialized, use the materialized subgraph to respond to the query.

2. The system of claim 1, wherein analysis of workload data is performed prior to receiving the query.

3. The system of claim 1, wherein the normalized signature is independent of a particular instance of data.

4. The system of claim 1, wherein the stored information regarding analyzed workload data further comprises at least one of compiled query subgraphs, optimized plans and estimated statistics, execution graphs and resources, or actual runtime statistics of executed queries.

5. The system of claim 1, wherein the stored information regarding analyzed workload data further comprises information regarding a physical design for at least one subgraph to be materialized.

6. The system of claim 1, wherein the stored information regarding analyzed workload data further comprises information regarding expiry of a materialized subgraph.

7. The system of claim 1, wherein the stored information regarding analyzed workload data is based, at least in part, upon a user selectable setting regarding at least one of storage costs, latency, CPU hours, or frequency.

8. The system of claim 1, wherein the stored information regarding analyzed workload data is based upon analysis of runtime statistics of subgraphs of a plurality of jobs including at least one of latency, cardinality, data size, or resource consumption of subgraphs.

9. A method of automatically reusing overlapping computations in an analytics job service, the method comprising:
    receiving a query;
    determining overlapping subgraphs of the query using stored information regarding analyzed workload data, the stored information including a normalized signature for a particular subgraph, the normalized signature identifies a particular subgraph across recurring instances of data;
    providing information regarding the determined overlapping subgraphs of the query, the information regarding overlapping subgraphs comprising a normalized signature for each overlapping subgraph;
    using the provided information, determining which of the overlapping subgraphs is to be materialized;
    for each overlapping subgraph determined to be materialized:
        determining whether or not the particular subgraph has been materialized using a precise signature corresponding to a normalized signature of the particular overlapping subgraph, the precise signature identifies a particular subgraph corresponding to the normalized signature within a particular recurring instance of data;
        when the particular subgraph has not been materialized, materializing the subgraph and use the materialized subgraph to respond to the query; and
        when the particular subgraph has been materialized, using the materialized subgraph to respond to the query.

10. The method of claim 9, wherein analysis of workload data is performed prior to receiving the query.

11. The method of claim 9, wherein the normalized signature is independent of a particular instance of data.

12. The method of claim 9, wherein the stored information regarding analyzed workload data further comprises at least one of compiled query subgraphs, optimized plans and estimated statistics, execution graphs and resources, or actual runtime statistics of executed queries.

13. The method of claim 9, wherein the stored information regarding analyzed workload data further comprises information regarding a physical design for at least one subgraph to be materialized.

14. The method of claim 9, wherein the stored information regarding analyzed workload data further comprises information regarding expiry of a materialized subgraph.

15. The method of claim 9, wherein the stored information regarding analyzed workload data is based, at least in part, upon a user selectable setting regarding at least one of storage costs, latency, CPU hours, or frequency.

16. The method of claim 9, wherein the stored information regarding analyzed workload data is based upon analysis of runtime statistics of subgraphs of a plurality of jobs including at least one of latency, cardinality, data size, or resource consumption of subgraphs.

17. A computer storage media storing computer-readable instructions that, when executed, cause a computing device to:
   determine overlapping subgraphs of a query using stored information regarding analyzed workload data, the stored information including a normalized signature for a particular subgraph, the normalized signature identifies a particular subgraph across recurring instances of data;
   provide information regarding the determined overlapping subgraphs of the query, the information regarding overlapping subgraphs comprising a normalized signature for each overlapping subgraph;
   using the provided information, determine which of the overlapping subgraphs is to be materialized;
   for each overlapping subgraph determined to be materialized:
      determine whether or not the particular subgraph has been materialized using a precise signature corresponding to a normalized signature of the particular overlapping subgraph, the precise signature identifies a particular subgraph corresponding to the normalized signature within a particular recurring instance of data;
      when the particular subgraph has not been materialized, materialize the subgraph and use the materialized subgraph to respond to the query; and
      when the particular subgraph has been materialized, use the materialized subgraph to respond to the query.

18. The computer storage media of claim 17, wherein the stored information regarding analyzed workload data further comprises at least one of compiled query subgraphs, optimized plans and estimated statistics, execution graphs and resources, or actual runtime statistics of executed queries.

19. The computer storage media of claim 17, wherein the stored information regarding analyzed workload data further comprises information regarding a physical design for at least one subgraph to be materialized.

20. The computer storage media of claim 17, wherein the stored information regarding analyzed workload data further comprises information regarding expiry of a materialized subgraph.

* * * * *